US012592098B2

(12) United States Patent
Wang et al.

(10) Patent No.: US 12,592,098 B2
(45) Date of Patent: Mar. 31, 2026

(54) GESTURE RECOGNIZING METHOD, INTERACTIVE METHOD, GESTURE INTERACTIVE SYSTEM, ELECTRONIC DEVICE, AND STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Meili Wang, Beijing (CN); Yaoyu Lv, Beijing (CN); Lili Chen, Beijing (CN); Xue Dong, Beijing (CN); Hao Zhang, Beijing (CN); Jiabin Wang, Beijing (CN); Yangbing Li, Beijing (CN); Mingdong Wang, Beijing (CN); Lei Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 333 days.

(21) Appl. No.: 18/254,236

(22) PCT Filed: Apr. 19, 2022

(86) PCT No.: PCT/CN2022/087576
§ 371 (c)(1),
(2) Date: May 24, 2023

(87) PCT Pub. No.: WO2023/201512
PCT Pub. Date: Oct. 26, 2023

(65) Prior Publication Data
US 2024/0355146 A1      Oct. 24, 2024

(51) Int. Cl.
*G06F 3/01* (2006.01)
*G06T 7/55* (2017.01)
(Continued)

(52) U.S. Cl.
CPC ................ *G06V 40/28* (2022.01); *G06T 7/55* (2017.01); *G06T 7/74* (2017.01); *G06F 3/017* (2013.01);
(Continued)

(58) Field of Classification Search
CPC .. G06V 40/28; G06T 7/55; G06T 7/74; G06T 2207/10016; G06T 2207/30196; G06F 3/017; G06F 3/01
See application file for complete search history.

(56) References Cited

U.S. PATENT DOCUMENTS

| 8,970,696 B2 | 3/2015 | Xiong | |
|---|---|---|---|
| 2012/0204133 A1* | 8/2012 | Guendelman | ........... G06F 3/017 |
| | | | 715/863 |
| 2016/0033753 A1 | 2/2016 | Saito et al. | |

FOREIGN PATENT DOCUMENTS

| CN | 102402680 A | 4/2012 |
|---|---|---|
| CN | 106648078 A | 5/2017 |

(Continued)

OTHER PUBLICATIONS

Igorevich, Rustam Rakhimov, et al. "Hand gesture recognition algorithm based on grayscale histogram of the image." 2010 4th International Conference on Application of Information and Communication Technologies. IEEE, 2010. (Year: 2010).*
(Continued)

*Primary Examiner* — Andrew M Moyer
*Assistant Examiner* — Dylan John Mendez Muniz
(74) *Attorney, Agent, or Firm* — LEASON ELLIS LLP

(57) ABSTRACT

A gesture recognizing method, an interactive method, a gesture interactive system, an electronic device, and a non-transitory computer-readable storage medium are disclosed. The gesture recognizing method includes: acquiring a plurality of groups of images taken respectively at different photographing moments for a gesture action object, wherein each group of images includes at least one pair of corresponding depth map and grayscale map; and according to the plurality of groups of images, obtaining spatial information by using the depth map in each group of images, and obtaining posture information for the gesture action object by using the grayscale map in each group of the images, to recognize a dynamic gesture change of the gesture action object. The gesture recognizing method reduces the processing time as a whole, can quickly obtain gesture recognition results, reduce the system resource occupation, and ensure the real-time gesture interaction.

20 Claims, 9 Drawing Sheets

| | | | | | | | | | | |
|---|---|---|---|---|---|---|---|---|---|---|
| First frame | ... | DCS3 | DCS0 | DCS1 | DCS2 | DCS3 | DCS0 | DCS1 | DCS2 | DCS3 |
| Second frame | ... | f1_M f1_1 | f1_2 | f1_3 | f1_4 | ... | f1_M f1_1 f2_2 | f2_3 | f2_4 | ... | f2_M f3_1 f3_2 ... |
| Depth map output by the first acquiring unit | | Dep_t | | | | | Dep_t+1 | | | | Dep_t+2 |
| Grayscale map output by the second acquiring unit | | 0_M 1_1 | 1_2 | 1_3 | 1_4 | ... | 1_M 2_1 2_2 2_3 2_4 | | | | 2_M 3_1 3_2 ... |
| Depth map output by the photographing apparatus | ... | D1 Dep_t D2 D3 D4 | | | | ... | DM Dep_t+1 DM+ DM+ DM+ | | | | D2M Dep_t+2 D2M+ ... |

(51) Int. Cl.
    *G06T 7/73*       (2017.01)
    *G06V 40/20*     (2022.01)

(52) U.S. Cl.
    CPC ............... *G06T 2207/10016* (2013.01); *G06T 2207/30196* (2013.01)

(56)            References Cited

FOREIGN PATENT DOCUMENTS

| CN | 114138121 A | * | 3/2022 | ............. G06F 3/017 |
| CN | 115421642 A | * | 12/2022 | ......... G06F 3/04855 |

OTHER PUBLICATIONS

Real Time Hand Gesture Recognition & Its Applications In Assistive Technologies For Disabled (Year: 2018).*

* cited by examiner (1)          (2)

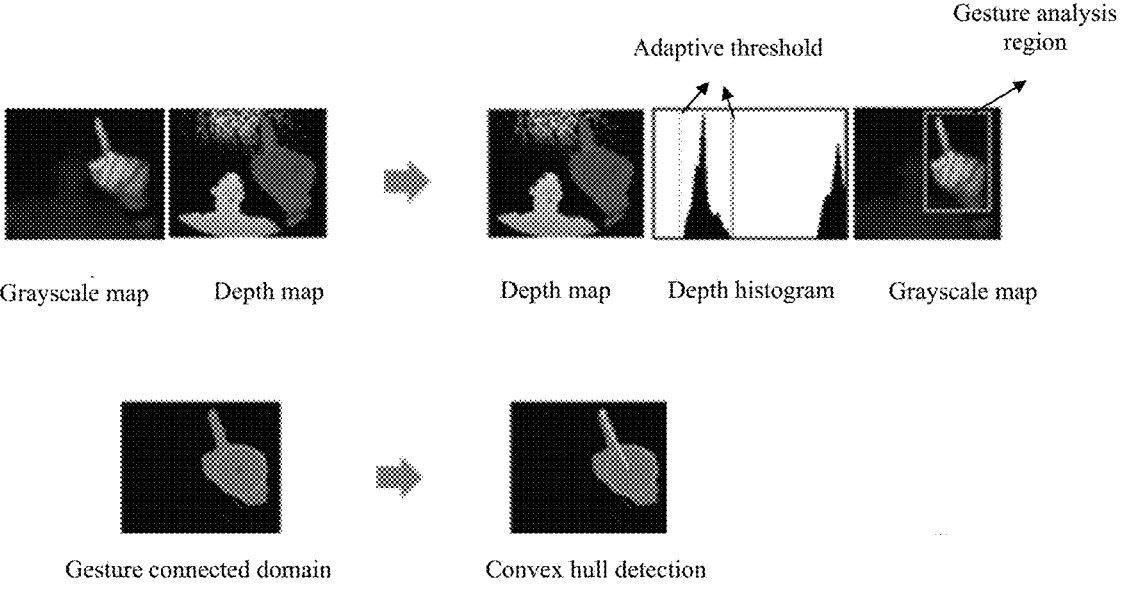

Adaptive threshold

Gesture analysis region

Grayscale map    Depth map        Depth map    Depth histogram    Grayscale map

Gesture connected domain        Convex hull detection

FIG. 5B

| | frame1 | | | | frame2 | | | | frame3 | | | |
|---|---|---|---|---|---|---|---|---|---|---|---|---|---|
| Time | DCS0 | DCS1 | DCS2 | DCS3 | DCS0 | DCS1 | DCS2 | DCS3 | DCS0 | DCS1 | DCS2 | DCS3 | ••• |
| Grayscale map output by the first acquiring unit | Gray0 | Gray1 | Gray2 | Gray3 | Gray4 | Gray5 | Gray6 | Gray7 | Gray8 | Gray9 | Gray10 | Gray11 | |
| Depth map output by the first acquiring unit | | | | Dep0 | | | | Dep1 | | | | Dep2 | ••• |

FIG. 6

| | frame1 | | | | frame2 | | | | frame3 | | | |
|---|---|---|---|---|---|---|---|---|---|---|---|---|---|
| Time | DCS0 | DCS1 | DCS2 | DCS3 | DCS0 | DCS1 | DCS2 | DCS3 | DCS0 | DCS1 | DCS2 | DCS3 | ••• |
| Grayscale map output by the first acquiring unit | Gray0 | Gray1 | Gray2 | Gray3 | Gray4 | Gray5 | Gray6 | Gray7 | Gray8 | Gray9 | Gray10 | Gray11 | |
| Depth map output by the first acquiring unit | Dep0_1 | Dep0_2 | Dep0_3 | Dep0 | Dep1_1 | Dep1_2 | Dep1_3 | Dep1 | Dep2_1 | Dep2_2 | Dep2_3 | Dep2 | ••• |

FIG. 7A

Figure 7B:
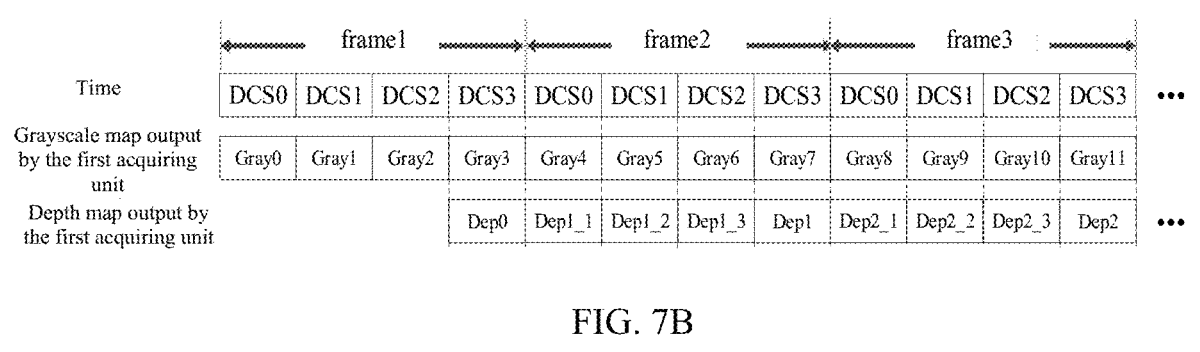

| | frame1 | | | | frame2 | | | | frame3 | | | |
|---|---|---|---|---|---|---|---|---|---|---|---|---|
| Time | DCS0 | DCS1 | DCS2 | DCS3 | DCS0 | DCS1 | DCS2 | DCS3 | DCS0 | DCS1 | DCS2 | DCS3 | ••• |
| Grayscale map output by the first acquiring unit | Gray0 | Gray1 | Gray2 | Gray3 | Gray4 | Gray5 | Gray6 | Gray7 | Gray8 | Gray9 | Gray10 | Gray11 | |
| Depth map output by the first acquiring unit | | | | Dep0 | Dep1_1 | Dep1_2 | Dep1_3 | Dep1 | Dep2_1 | Dep2_2 | Dep2_3 | Dep2 | ••• |

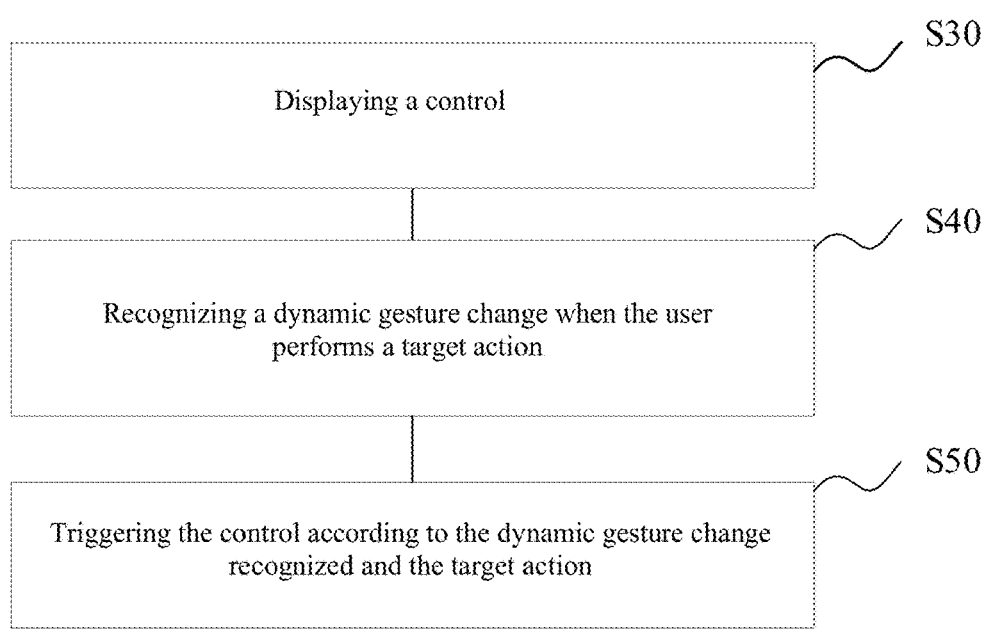

S30

Displaying a control

S40

Recognizing a dynamic gesture change when the user performs a target action

S50

Triggering the control according to the dynamic gesture change recognized and the target action

FIG. 8

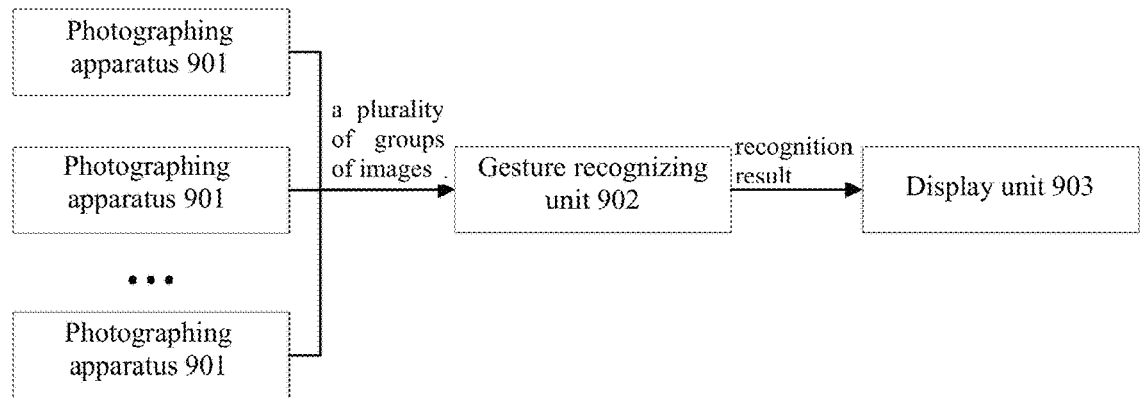

Photographing apparatus 901

Photographing apparatus 901

...

Photographing apparatus 901 a plurality of groups of images

Gesture recognizing unit 902 recognition result

Display unit 903

FIG. 9

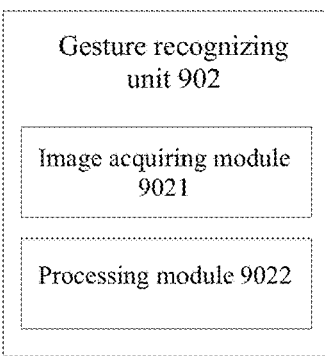

Gesture recognizing unit 902

Image acquiring module 9021

Processing module 9022

FIG. 10

GESTURE RECOGNIZING METHOD, INTERACTIVE METHOD, GESTURE INTERACTIVE SYSTEM, ELECTRONIC DEVICE, AND STORAGE MEDIUM

CROSS-REFERENCE TO RELATED PATENT APPLICATIONS

This application is a U.S. National Stage Application under 35 U.S.C. § 371 of International Patent Application No. PCT/CN2022/087576, filed Apr. 19, 2022, which is incorporated by reference in its entirety.

TECHNICAL FIELD

Embodiments of the present disclosure relate to a gesture recognizing method, an interactive method, a gesture interactive system, an electronic device, and a non-transitory computer-readable storage medium.

BACKGROUND

With continuous development of naked-eye 3-Dimension (3D) light field display, in order to achieve an effect of stereoscopic 3D display, objects displayed in 3D will have to exit and enter a screen. When people watch 3D display, in order to immersively interact with the content displayed in 3D, it is necessary to provide an interactive system or method that can obtain depth information, and have high precision, low delay, and large field of view, to achieve interaction between a user and the content displayed in 3D.

At present, implementing interactive functions based on gesture recognition technology is a major research hotspot, and it has been applied in many fields such as naked-eye 3D displays, VR/AR/MR, vehicles, game entertainment, smart wearables, and industrial design. A core of implementing interactive functions based on gesture recognition technology is to acquire user's gesture information through a sensor device such as a camera, recognize gestures through relevant recognition and classification algorithms, and assign different semantic information to different gestures, so as to implement different interactive functions.

SUMMARY

At least one embodiment of the present disclosure provides a gesture recognizing method, comprising: acquiring a plurality of groups of images taken respectively at different photographing moments for a gesture action object, wherein each group of images comprises at least one pair of corresponding depth map and grayscale map; and according to the plurality of groups of images, obtaining spatial information by using the depth map in each group of images, and obtaining posture information for the gesture action object by using the grayscale map in each group of the images, to recognize a dynamic gesture change of the gesture action object.

For example, in the gesture recognizing method provided by at least one embodiment of the present disclosure, obtaining the spatial information by using the depth map in each group of images, comprises: determining a gesture region in the depth map according to the depth map, wherein the spatial information comprises the gesture region in the depth map; obtaining the posture information for the gesture action object by using the grayscale map in each group of the images, comprises: determining the posture information for the gesture action object corresponding to each group of images according to the gesture region in the depth map and the grayscale map; and recognizing the dynamic gesture change of the gesture action object, comprises: determining the dynamic gesture change of the gesture action object according to posture information for the gesture action object respectively corresponding to the plurality of groups of images.

For example, in the gesture recognizing method provided by at least one embodiment of the present disclosure, determining the gesture region in the depth map according to the depth map, comprises: traversing the depth map, and counting depth data in the depth map, to build a depth histogram; selecting an adaptive depth threshold corresponding to the depth map, and determining the gesture region in the depth map according to the adaptive depth threshold and the depth histogram.

For example, in the gesture recognizing method provided by at least one embodiment of the present disclosure, the posture information for the gesture action object corresponding to each group of images comprises finger state information and position information, determining the posture information for the gesture action object corresponding to each group of images, according to the grayscale map and the gesture region in the depth map, comprises: applying the gesture region in the depth map to the grayscale map to obtain a gesture analysis region in the grayscale map; performing binary processing on the gesture analysis region to obtain a gesture connected domain; performing convex hull detection on the gesture connected domain to obtain the finger state information, wherein the finger state information comprises whether a finger is stretched out or not, and a count of fingers stretched out; and determining the position information based on the depth map, wherein the position information comprises a coordinate position of the gesture action object in a gesture interactive space.

For example, in the gesture recognizing method provided by at least one embodiment of the present disclosure, determining the dynamic gesture change of the gesture action object according to the posture information for the gesture action object respectively corresponding to the plurality of groups of images, comprises: determining a finger outstretched state change and a position change of the gesture action object during a recognition period composed of the different photographing moments, according to finger state information and position information corresponding to the plurality of groups of images; and determining the dynamic gesture change of the gesture action object, according to the finger outstretched state change and the position change.

For example, in the gesture recognizing method provided by at least one embodiment of the present disclosure, the coordinate position comprises a depth coordinate, the dynamic gesture change of the gesture action object comprises a gesture action, determining the dynamic gesture change of the gesture action object, according to the finger outstretched state change and the position change, comprises: determining that the gesture action is a click gesture, in response to the finger outstretched state change indicating that at least one finger of the gesture action object is in an outstretched state during at least part of time period of the recognition period, and the position change indicating that a depth coordinate of a target recognition point of the gesture action object decreases first and then increases during the at least part of time period.

For example, in the gesture recognizing method provided by at least one embodiment of the present disclosure, the coordinate position comprises a depth coordinate, and the dynamic gesture change of the gesture action object comprises a gesture action, determining the dynamic gesture change of the gesture action object, according to the finger outstretched state change and the position change, comprises: determining that the gesture action is a long-press gesture, in response to the finger outstretched state change indicating that at least one finger of the gesture action object is in an outstretched state during at least part of time period of the recognition period, and the position change indicating that a depth coordinate of a target recognition point of the gesture action object decreases first and then is maintained during the at least part of time period, and a time length for the maintenance exceeding a first threshold.

For example, in the gesture recognizing method provided by at least one embodiment of the present disclosure, the dynamic gesture change of the gesture action object comprises a gesture action, determining the dynamic gesture change of the gesture action object, according to the finger outstretched state change and the position change, comprises: determining that the gesture action is a slide gesture, in response to the finger outstretched state change indicating that at least one finger of the gesture action object is in an outstretched state during at least part of time period of the recognition period, and the position change indicating that a distance that a target recognition point of the gesture action object slides along a preset direction during the at least part of time period exceeds a second threshold, wherein the distance is calculated based on position information of the target recognition point of the gesture action object in the plurality of groups of images.

For example, in the gesture recognizing method provided by at least one embodiment of the present disclosure, the dynamic gesture change of the gesture action object comprises a gesture action, determining the dynamic gesture change of the gesture action object, according to the finger outstretched state change and the position change, comprises: determining that the gesture action is a grab gesture, in response to the finger outstretched state change indicating that the gesture action object transitions from a state where at least one finger is stretched out to a state where no finger is stretched out during the recognition period.

For example, in the gesture recognizing method provided by at least one embodiment of the present disclosure, the dynamic gesture change of the gesture action object comprises a gesture action, determining the dynamic gesture change of the gesture action object, according to the finger outstretched state change and the position change, comprises: determining that the gesture action is a release gesture, in response to the finger outstretched state change indicating that the gesture action object transitions from a state where no finger is stretched out to a state where at least one finger is stretched out during the recognition period.

For example, in the gesture recognizing method provided by at least one embodiment of the present disclosure, determining the dynamic gesture change of the gesture action object, according to the finger outstretched state change and the position change, further comprises: before determining the gesture action, determining whether the gesture action object has a still time exceeding a third threshold before an action change occurs; continuing to determine the gesture action in response to an existence of the still time exceeding the third threshold; and determining that no change in the gesture action has occurred, in response to an absence of the still time exceeding the third threshold.

For example, in the gesture recognizing method provided by at least one embodiment of the present disclosure, the dynamic gesture change of the gesture action object further comprises a gesture position, determining the dynamic gesture change of the gesture action object, according to the finger outstretched state change and the position change, further comprises: in response to the gesture action being a click gesture, a long-press gesture or a slide gesture, determining that the gesture position is obtained based on position information of a target recognition point of the gesture action object, wherein the target recognition point comprises a fingertip of a target finger; and in response to the gesture action being a grab gesture or a release gesture, determining that the gesture position is obtained based on position information of a gesture center of the gesture action object, wherein the gesture center is a center of a largest inscribed circle of the gesture connected domain.

For example, in the gesture recognizing method provided by at least one embodiment of the present disclosure, determining that the gesture position is obtained based on the position information of the target recognition point of the gesture action object, comprises: acquiring a plurality of position information respectively corresponding to a plurality of sampling points at preset positions around the target recognition point; obtaining the gesture position according to the plurality of position information and the position information of the target recognition point; and determining that the gesture position is obtained based on the position information of the gesture center of the gesture action object, comprises: acquiring a plurality of position information respectively corresponding to a plurality of sampling points at preset positions around the gesture center; and obtaining the gesture position according to the plurality of position information and the position information of the gesture center.

For example, in the gesture recognizing method provided by at least one embodiment of the present disclosure, acquiring the plurality of groups of images taken respectively at different photographing moments for the gesture action object, comprises: obtaining a plurality of groups of images respectively corresponding to the different photographing moments, by using at least one photographing apparatus to continuously photograph the gesture action object, wherein each photographing apparatus is configured to synchronously output a pair of corresponding depth map and grayscale map at one photographing moment.

For example, in the gesture recognizing method provided by at least one embodiment of the present disclosure, the gesture action object is closest to the at least one photographing apparatus relative to other objects in each image.

For example, in the gesture recognizing method provided by at least one embodiment of the present disclosure, a plurality of photographing apparatuses are provided, each group of images comprises a plurality of pairs of corresponding depth maps and grayscale maps, the plurality of pairs of corresponding depth maps and grayscale maps are obtained by synchronously photographing the gesture action object by the plurality of photographing apparatuses at a same photographing moment, and the plurality of pairs of corresponding depth maps and grayscale maps have different photographing angles.

For example, in the gesture recognizing method provided by at least one embodiment of the present disclosure, according to the plurality of groups of images, obtaining the spatial information by using the depth map in each group of images, and obtaining the posture information for the gesture action object by using the grayscale map in each group of the images, to recognize the dynamic gesture change of the gesture action object, further comprises: based on a plurality of pairs of depth maps and grayscale maps respectively belonging to the plurality of groups of images and corresponding to the different photographing moments obtained by a same photographing apparatus, determining an intermediate gesture change of the gesture action object corresponding to the same photographing apparatus; and weighting and filtering a plurality of intermediate gesture changes respectively corresponding to the plurality of photographing apparatuses to obtain the dynamic gesture change of the gesture action object.

For example, in the gesture recognizing method provided by at least one embodiment of the present disclosure, obtaining the plurality of groups of images respectively corresponding to the different photographing moments, by using the at least one photographing apparatus to continuously photograph the gesture action object, comprises: by using each photographing apparatus to continuously photograph the gesture action object, obtaining a plurality of pairs of depth maps and grayscale maps respectively corresponding to the different photographing moments output by the photographing apparatus.

For example, in the gesture recognizing method provided by at least one embodiment of the present disclosure, each photographing apparatus comprises a first acquiring unit, the first acquiring unit is configured to acquire a grayscale map in every first frame, and acquire a depth map in every N first frames, wherein the depth map is generated based on N grayscale maps acquired in every N consecutive first frames, the N grayscale maps respectively correspond to N different phases, the depth map and one grayscale map among the N grayscale maps are synchronously output from the photographing apparatus, where N is a positive integer greater than 1; by using each photographing apparatus to continuously photograph the gesture action object, obtaining the plurality of pairs of depth maps and grayscale maps respectively corresponding to the different photographing moments output by the photographing apparatus, comprises: outputting a pair of corresponding depth map and grayscale map in every first frame by using the photographing apparatus, wherein the output depth map is obtained by smooth trajectory fitting and prediction according to the N grayscale maps and the depth map.

For example, in the gesture recognizing method provided by at least one embodiment of the present disclosure, each photographing apparatus comprises a first acquiring unit, the first acquiring unit is configured to acquire a grayscale map in every first frame, and acquire a depth map in every N first frames, wherein the depth map is generated based on N grayscale maps acquired in every N consecutive first frames, the N grayscale maps respectively correspond to N different phases, the depth map and one grayscale map among the N grayscale maps are synchronously output from the photographing apparatus, where N is a positive integer greater than 1; by using each photographing apparatus to continuously photograph the gesture action object, obtaining the plurality of pairs of depth maps and grayscale maps respectively corresponding to the different photographing moments output by the photographing apparatus, comprises: outputting a pair of corresponding depth map and grayscale map in at most every N−1 first frames by using the photographing apparatus, wherein the output depth map is obtained based on grayscale maps of N−1 first frames adjacent to the output grayscale map, and the output grayscale map and the grayscale maps of the N−1 first frames correspond to the N different phases.

For example, in the gesture recognizing method provided by at least one embodiment of the present disclosure, each photographing apparatus comprises a first acquiring unit and a second acquiring unit, the second acquiring unit is configured to output a grayscale map in every second frame, and the first acquiring unit is configured to output a depth map in every M second frames, where M is a positive integer greater than 1, by using each photographing apparatus to continuously photograph the gesture action object, obtaining the plurality of pairs of depth maps and grayscale maps respectively corresponding to the different photographing moments output by the photographing apparatus, comprises: outputting a pair of corresponding depth map and grayscale map in at most every M−1 second frames by using the photographing apparatus, wherein the output depth map comprises a reference depth map, or a depth map obtained by smooth trajectory fitting and prediction based on the reference depth map and at least one grayscale map corresponding to the reference depth map, wherein the reference depth map comprises a depth map output by the first acquiring unit at a current second frame or before the current second frame, the current second frame is a second frame outputting the pair of corresponding depth map and grayscale map, and the at least one grayscale map comprises a grayscale map output by the second acquiring unit between the current second frame and a second frame corresponding to the reference depth map.

For example, in the gesture recognizing method provided by at least one embodiment of the present disclosure, the first acquiring unit is further configured to obtain a pair of corresponding depth map and grayscale map in every first frame, the depth map is obtained by calculating the grayscale maps of the N−1 first frames adjacent to the grayscale image obtained, the grayscale map obtained and the grayscale maps of the N−1 first frames correspond to N different phases, and a frame length of the first frame is greater than a frame length of the second frame, where N is a positive integer greater than 1.

At least one embodiment of the present disclosure provides an interactive method, the interactive method comprises: displaying a control; recognizing the dynamic gesture change in a case where a user performs a target action, by using the gesture recognizing method as mentioned above; and triggering the control according to the dynamic gesture change recognized and the target action.

For example, in the interactive method provided by at least one embodiment of the present disclosure, the dynamic gesture change comprises a gesture action, triggering the control according to the dynamic gesture change recognized and the target action, comprises: triggering the control and displaying a visual feedback effect, in response to the gesture action of the user being consistent with the target action.

For example, in the interactive method provided by at least one embodiment of the present disclosure, the dynamic gesture change comprises a gesture action and a gesture position, triggering the control according to the dynamic gesture change recognized and the target action, comprises: triggering the control and displaying a visual feedback effect, in response to the gesture action of the user being consistent with the target action, and the gesture position of the user matching a control position of the control, wherein the gesture position of the user matching a control position of the control indicates that a position in a coordinate system of the control where the gesture position is mapped to according to a mapping relationship is consistent with the control position.

At least one embodiment of the present disclosure provides a gesture interactive system, the gesture interactive system comprises: at least one photographing apparatus, configured to continuously photograph a gesture action object, to acquire a plurality of groups of images taken respectively at different photographing moments for the gesture action object; a gesture recognizing unit, configured to receive the plurality of groups of images, perform the gesture recognizing method as mentioned above, and output a recognition result of the dynamic gesture change of the gesture action object; and a display unit, configured to receive the recognition result, and display an interactive effect according to the recognition result.

For example, in the gesture interactive system provided by at least one embodiment of the present disclosure, the gesture interactive system comprises a plurality of photographing apparatuses, and the plurality of photographing apparatuses are configured to synchronously photograph the gesture action object from different angles, so as to obtain a plurality of pairs of corresponding depth maps and grayscale maps at a same photographing moment.

For example, in the gesture interactive system provided by at least one embodiment of the present disclosure, each photographing apparatus comprises a first acquiring unit and a second acquiring unit, and the first acquiring unit and the second acquiring unit are configured to synchronously photograph the gesture action object.

For example, in the gesture interactive system provided by at least one embodiment of the present disclosure, the plurality of photographing apparatuses are configured to select some or all of the plurality of photographing apparatuses to photograph the gesture action object according to a position of the gesture action object in a gesture interactive space.

For example, in the gesture interactive system provided by at least one embodiment of the present disclosure, the gesture recognizing unit comprises a digital signal processor.

At least one embodiment of the present disclosure provides an electronic device, the electronic device comprises: a memory, for non-transitorily storing computer-executable instructions; a processor, configured to execute the computer-executable instructions, wherein the computer-executable instructions, when executed by the processor, implement the gesture recognizing method or the interactive method according to any embodiment of the present disclosure.

At least one embodiment of the present disclosure provides a non-transitory computer-readable storage medium, the non-transitory computer-readable storage medium stores computer-executable instructions, and the computer-executable instructions, when executed by a processor, implement the gesture recognizing method or the interactive method according to any embodiment of the present disclosure.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

FIG. 5B is a schematic diagram of a posture information extracting process provided by an embodiment of the present disclosure;

FIG. 6 shows a relationship between a depth map and a grayscale map of the TOF camera;

FIG. 7A is a schematic diagram of a corresponding relationship between a depth map and a grayscale map provided by an embodiment of the present disclosure;

FIG. 7B is a schematic diagram of a corresponding relationship between a depth map and a grayscale map provided by another embodiment of the present disclosure;

FIG. 7C is a schematic diagram of a corresponding relationship between a depth map and a grayscale map provided by an embodiment of the present disclosure;

FIG. 8 is a schematic flow chart of an interactive method provided by at least one embodiment of the present disclosure;

FIG. 9 is a schematic block diagram of a gesture interactive system provided by at least one embodiment of the present disclosure;

FIG. 10 is a schematic block diagram of a gesture recognizing unit provided by at least one embodiment of the present disclosure;

DETAILED DESCRIPTION

Figure 1:
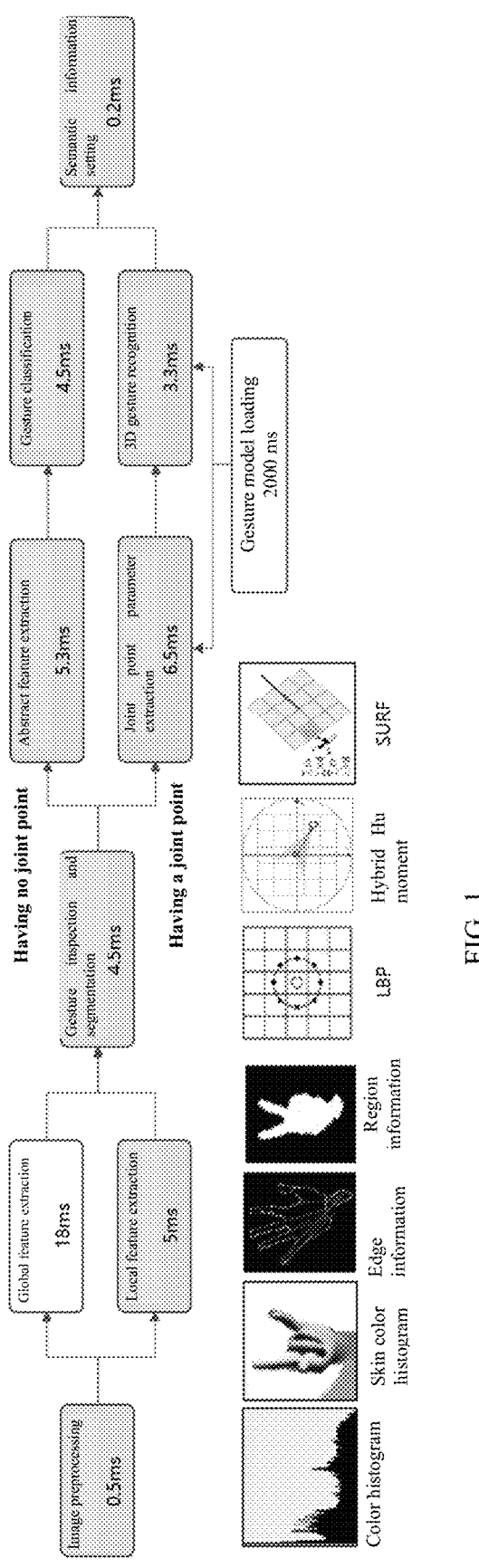
FIG. 1 shows a schematic flow chart of gesture recognition.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Gesture interaction refers to use of computer graphics and other technologies to recognize a body language of a gesture action object and convert the body language into instructions to operate a device. It is a new way of human-computer interaction following the mouse, keyboard and touch screen. Among many interactive methods, gesture interaction is in line with human communication habits and is the most frequently used in daily life. It has irreplaceable natural advantages, such as:

1) A learning cost of gesture interaction is low, and there is no need to remember a difference between double-click and left-right click of the mouse as in traditional interactive methods;

2) Gesture interaction can be separated from physical contact to achieve remote control;

3) Interactive actions are more abundant and natural, and a variety of different gestures can be designed according to scenario so as to achieve a variety of different interactive effects;

4) There is less impact on normal activities of users, and gesture operations can be performed anytime and anywhere.

Based on these advantages, gesture interaction is a very popular research field and can be applied to a variety of application scenarios.

Usually, a sensor device for acquiring gestures may be a monocular camera, a binocular camera, a structured light camera, a Time of Flight (TOF) camera, and the like.

Gesture images acquired by the monocular camera do not contain depth information. A deep learning method is often used to extract abstract features of gestures and complete gesture classifying tasks. This method requires very high system computing power and high image resolution (for example, the resolution needs to reach 1920 pixels*1080 pixels), and its processing speed is slow.

The binocular camera can calculate a depth through parallax information, and usually use the deep learning method to implement positioning of three-dimensional joint points of a gesture. However, the parallax registration of binocular data itself requires a huge system computing power, and this method also requires very high system computing power.

The structured light camera uses an infrared light source to project a pattern into space. Because an infrared camera is sensitive to light, depth information of a scene is calculated through a degree of deformation of the pattern. This method requires a very large amount of data to be processed, and usually requires a dedicated processing chip to calculate the depth information, and the cost is relatively high.

The TOF camera uses a time-of-flight technology to calculate the depth information of the scene through time difference or phase difference, which requires little computing power. However, when the TOF camera is used for gesture recognition, it is also necessary to use the deep learning method to extract gesture joint points in the image, which requires high computing power, and the processing speed is usually above 20 ms.

Therefore, the current gesture recognizing methods are all implemented by using the deep learning method. FIG. 1 shows a schematic flow chart of gesture recognition.

As shown in FIG. 1, firstly, an image is preprocessed to extract some gesture features. The gesture features include a global feature and a local feature. The forms of gesture features include color histogram, skin color information, edge information, region information, etc., thereby implementing gesture detection and segmentation. As shown in FIG. 1, image preprocessing takes 0.5 ms (millisecond), global feature extraction takes 18 ms, local feature extraction takes 5 ms, and gesture detection and segmentation takes 4.5 ms.

Then, abstract features are extracted, such as Local Binary Patterns (LBP), Hu moment (image moment), Speeded-Up Robust Features (SURF), etc., to complete classification of the gesture. For example, if there are joint points in the gesture, joint point parameters can also be extracted by building a gesture joint point model, to complete recognition of the 3D gesture. As shown in FIG. 1, abstract feature extraction takes 5.3 ms, gesture classification takes 4.5 ms, joint point parameter extraction takes 6.5 ms, 3D gesture recognition takes 3.3 ms, and gesture joint point model loading takes 2000 ms.

Finally, by setting specified semantic information, different functions are assigned to different gestures. As shown in FIG. 1, semantic information processing takes 0.2 ms.

Therefore, the current gesture recognizing methods require high system computing power and a large delay. As shown in FIG. 1, a recognition delay of this method is usually 20 ms or more, making it difficult to achieve real-time interaction.

In addition, as described above, image acquisition in the existing gesture interactive systems is usually performed by the binocular camera, the structured light camera, the TOF camera, and the like. In an acquiring unit, raw data acquired by a sensor needs to be preprocessed in a computer using an Image Signal Processor (ISP) algorithm. The preprocessing includes black level compensation, lens correction, bad pixel correction, noise removal, phase correction, depth calculation, data calibration, etc. In particular, the structured light camera is generally equipped with a dedicated processing chip to execute the ISP algorithm because the amount of data to be processed is very large. Therefore, generally a depth camera resolution is 840 pixels*480 pixels, and a frame rate is 30 fps (frame per second).

Figure 2:
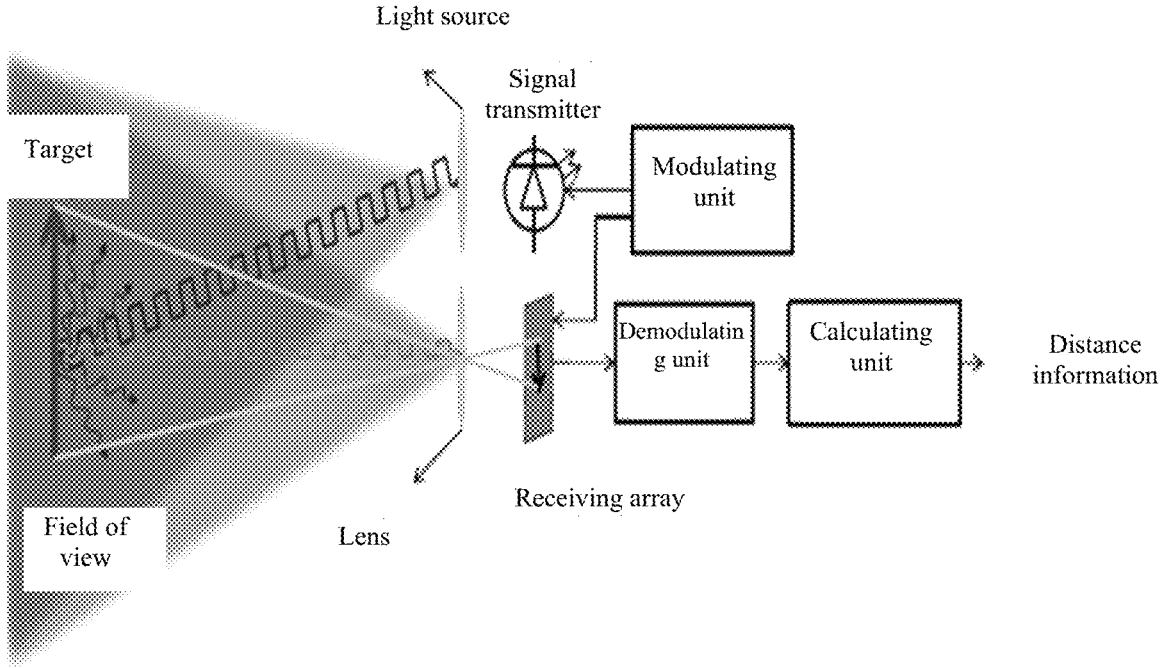
FIG. 2 shows a schematic diagram of a detecting process of a TOF camera.

FIG. 2 shows a schematic diagram of a detecting process of the TOF camera.

As shown in FIG. 2, the sensor used in the TOF camera is a silicon-based image sensor. The TOF camera includes at least three portions: a light source, a receiving array, and a circuit. The circuit includes a signal transmitter, a modulating unit, a demodulating unit, and a calculating unit. When photographing, firstly, the light source emits a beam of modulated infrared light, which is reflected after being irradiated on a target. After passing through the lens, the reflected modulated square wave is finally received by the receiving array, and then information is demodulated and calculated by the demodulating unit and the calculating unit to calculate distance information.

Due to a low frame rate of the depth camera, information processing takes up more resources, which further increases the delay of gesture interaction and increases resource consumption. Currently the gesture recognizing methods mostly use the deep learning method; as described above, its execution delay is relatively high, and its system resource overhead is also relatively large. Therefore, the current gesture interactive system generally consumes a lot of system resources, and has high delay and low precision, which is one of the reasons why gesture interaction technology is difficult to promote.

At least one embodiment of the present disclosure provides a gesture recognizing method, an interactive method, a gesture interactive system, an electronic device, and a non-transitory computer-readable storage medium. The gesture recognizing method includes: acquiring a plurality of groups of images taken respectively at different photographing moments for a gesture action object, wherein each group of images includes at least one pair of corresponding depth map and grayscale map; and according to the plurality of groups of images, obtaining spatial information by using the depth map in each group of images, and obtaining posture information for the gesture action object by using the grayscale map in each group of the images, to recognize a dynamic gesture change of the gesture action object.

The gesture recognizing method implements gesture recognition and positioning by using the synchronously acquired depth map and grayscale map containing the gesture action object, using the depth map to extract spatial information, using the grayscale map to obtain posture information, and through simple image processing. Because no complex deep learning algorithm is used, overall processing time is reduced, gesture recognition results can be obtained quickly, system resource occupation is reduced, and real-time gesture interaction is guaranteed. For example, by adopting the gesture recognizing method provided by at least one embodiment of the present disclosure, the processing time of gesture recognition can be reduced from 20 ms to 5 ms.

The gesture interactive method provided by the embodiments of the present disclosure can be applied to a mobile terminal (such as a mobile phone, a tablet computer, etc.). The gesture recognizing method provided by the embodiments of the present disclosure can be applied to the gesture interactive system provided by the embodiments of the present disclosure, and the gesture interactive system may be configured on an electronic device. The electronic device may be a personal computer, a mobile terminal, etc., and the mobile terminal may be a hardware device with various operating systems, such as a mobile phone and a tablet computer.

Hereinafter, the embodiments of the present disclosure will be described in detail with reference to the accompanying drawings, but the present disclosure is not limited to these specific embodiments.

Figure 3:
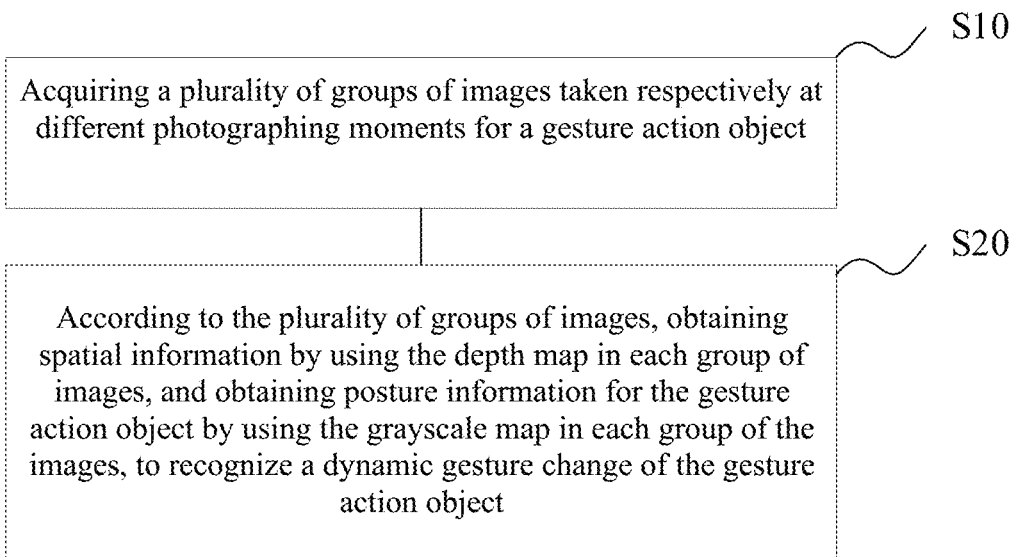
FIG. 3 shows a schematic flow chart of a gesture recognizing method provided by at least one embodiment of the present disclosure.

FIG. 3 is a schematic flow chart of a gesture recognizing method provided by at least one embodiment of the present disclosure.

As shown in FIG. 3, the gesture recognizing method provided by at least one embodiment of the present disclosure includes steps S10 to S20.

Step S10: acquiring a plurality of groups of images taken respectively at different photographing moments for a gesture action object.

For example, each group of images includes at least one pair of corresponding depth map and grayscale map. Herein, the "corresponding depth map and grayscale map" means that the depth map and grayscale map correspond to a same photographing moment.

For example, the gesture action object may include a hand of a human body, such as a user's hand. For example, the gesture action object may also include other hand objects that have a same shape as a human hand, for example, an article that has the shape of human hand, such as an inflatable balloon that is shaped like a hand in a clenched first state, etc., which is not specifically limited in the present disclosure.

For example, the step S10 may include: obtaining a plurality of groups of images respectively corresponding to the different photographing moments, by using at least one photographing apparatus to continuously photograph the gesture action object. For example, each photographing apparatus is configured to synchronously output a pair of corresponding depth map and grayscale map at one photographing moment.

For example, the gesture action object performs a gesture action within a photographing range of one or more photographing apparatus, the one or more photographing apparatus synchronously photograph the gesture action object within a preset recognition period, each photographing apparatus synchronously outputs a pair of corresponding depth map and grayscale map at a photographing moment, and the pair of corresponding depth map and grayscale map are photographed by the photographing apparatus at the same photographing moment.

For example, if one photographing apparatus is provided, one group of images is obtained at one photographing moment. The one group of images includes one pair of depth map and grayscale map. After photographing for a preset recognition period, a plurality of groups of images are obtained, and the plurality of groups of images corresponds to different photographing moments.

For example, if the number of photographing apparatuses is T, one group of images is obtained at one photographing moment. The one group of images includes T pairs of depth maps and grayscale maps. The T pairs of depth maps and grayscale maps are respectively from the T photographing apparatuses. After photographing for a preset recognition period, a plurality of groups of images are obtained, the plurality of groups of images corresponds to different photographing moments, and each group of images includes T pairs of depth maps and grayscale maps corresponding to the same photographing moments. Herein, T is a positive integer greater than 1.

For example, the T photographing apparatuses need to photograph the gesture action object synchronously. For example, the T photographing apparatuses receive trigger instructions at the same time, and synchronously photograph the gesture action object when receiving the trigger instructions, so as to obtain one group of images corresponding to the same photographing moment, and the one group of images includes T pairs of depth maps and grayscale maps.

For example, the T photographing apparatus are set with different photographing angles and at different photographing positions to photograph the gesture action object from different angles, so that the plurality pairs of depth maps and grayscale maps obtained at the same photographing moment have different photographing angles, which guarantees the gesture is not blocked to a certain extent, and reduces or avoids a case that a motion of the gesture action object cannot be detected due to the gesture being blocked such that the recognition fails.

For example, when photographing a gesture action object, the gesture action object is closest to the at least one photographing apparatus relative to other objects in the image.

For example, from a point of view of an interactive scene, the photographing apparatus may be integrated in a center of lower edge of a display unit, and a camera optical axis is tilted forward and upward to photograph the gesture action object, so it can be considered that the gesture action object is the object closest to the photographing apparatus.

Figure 4:
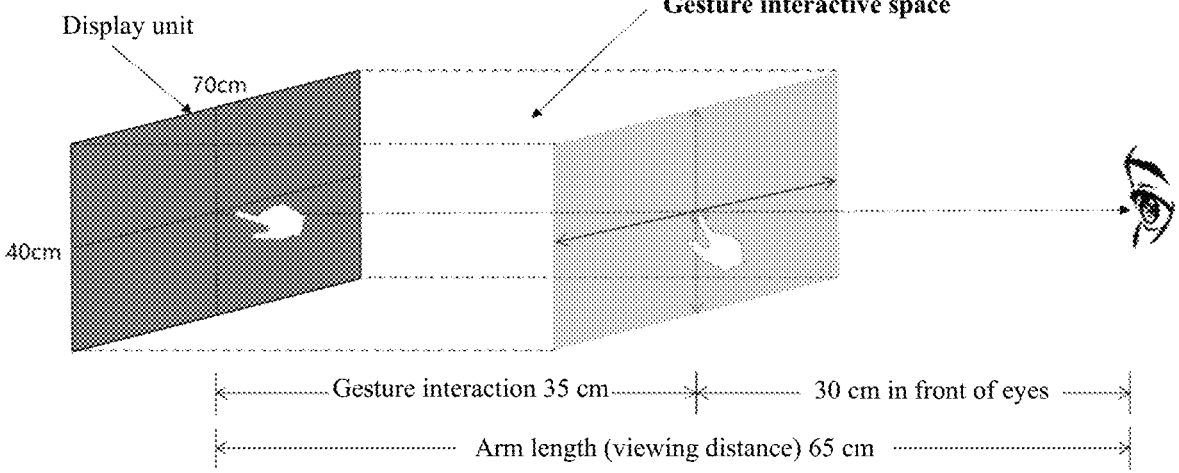
FIG. 4 is a schematic diagram of a gesture interactive space provided by at least one embodiment of the present disclosure.

FIG. 4 is a schematic diagram of a gesture interactive space provided by at least one embodiment of the present disclosure.

As shown in FIG. 4, the display unit has a width of 70 cm (centimeter), and a height of 40 cm. The display unit is used for displaying a display content that interacts with the gesture action object. For example, the display content includes a common and easy-to-understand control. A triggered behavior or function of the control will be pre-set. When triggered, the control will display visual feedback effects, such as changes in material, color, brightness, etc., to remind the user that the interaction is complete.

For example, the control may include a three-dimensional virtual control, and the control may be presented in various ways, such as a button, an icon, or a 3D model. For example, the display unit may be implemented as a three-dimensional display. For example, the three-dimensional display may be a naked-eye three-dimensional display, that is, the user can see the three-dimensional display effect with both eyes without other tools.

As shown in FIG. 4, assuming that an arm length of the human body is 65 cm, and the user watches at a distance of 65 cm in front of a screen, since the gesture action object (that is, the user's hand) needs to be 30 cm away from the eyes so as not to block the line of sight during gesture interaction, the gesture interactive space is a three-dimensional space with a size of 70 cm*40 cm*35 cm between the display unit and the user.

For example, the gesture action object moves in the gesture interactive space, the gesture action object is closest to the camera relative to other objects (such as other body portions of the user), and photographing apparatus continuously photograph the gesture action object to obtain a plurality of groups of images, so as to recognize a dynamic gesture change based on the plurality of groups of images.

It should be noted that what is shown in FIG. 4 is a possible way to define the gesture interactive space. Depending on a type of the display unit, a shape of the display unit, a size of the display unit, and the arm length of the user, the size of the gesture interactive space may also be different, which is not specifically limited in the present disclosure.

For example, in some embodiments, the photographing apparatus includes a first acquiring unit, for example, the first acquiring unit includes a TOF camera. In order to obtain higher depth precision, generally the TOF camera will use N grayscale maps corresponding to N different phases to calculate a depth map (for example, N=1, 4 or 8, etc.).

For example, the first acquiring unit is configured to acquire a grayscale map in every first frame, and acquire a depth map in every N first frames. For example, the depth map is generated based on N grayscale maps acquired in every N consecutive first frames, the N grayscale maps respectively correspond to N different phases, the depth map and one grayscale map among the N grayscale maps are synchronously output from the photographing apparatus. Herein, N is a positive integer greater than 1.

Herein, the first frame represents a phase time of a Differential Correlation Sample (DCS), for example, 25 ms (milliseconds). In every N first frames, the TOF camera synchronously outputs a pair of grayscale map and depth map, that is, the depth map and the grayscale map are aligned and calibrated every N first frames. Therefore, at this time, the photographing apparatus outputs a pair of grayscale map and depth map every N first frames. For example, when N=4, and when a frame length of the first frame is 25 ms, a pair of grayscale map and depth map is output every 100 ms.

Although the computing power required by the first acquiring unit is small, the delay is high and the frame rate is low. Therefore, the photographing apparatus may be configured to further include a second acquiring unit. The second acquiring unit is, for example, a high-speed grayscale camera.

For example, the second acquiring unit is configured to output a grayscale map every second frame, and the first acquiring unit is configured to output a depth map every M second frames, where M is a positive integer greater than 1.

For example, a frame length of the second frame is shorter than the frame length of the first frame. For example, the high-speed grayscale camera outputs a grayscale map every 8.3 ms, that is, the frame length of the second frame is 8.3 ms.

For example, the high-speed grayscale camera and the TOF camera implement alignment and calibration every M second frames. At this time, in combination with a prediction algorithm, etc., the time for the photographing apparatus to output a pair of grayscale map and depth map can be greatly reduced. For example, the photographing apparatus can output a pair of depth map and grayscale map in the shortest time of every second frame, that is, at this time, the photographing apparatus can output a pair of depth map and grayscale map at an interval of 8.3 ms. Compared with outputting a pair of depth map and grayscale map every 100 ms, the delay of image acquisition is greatly reduced, and the frame rate is greatly increased, low-latency real-time interaction requirements are met, rapid recognition of gesture action and gesture position is implemented as a whole, an absolute delay of the processing (including image acquiring time and image processing time) can be less than or equal to 15 ms, and a reporting rate can reach 120 Hz.

For the specific processing procedure of the photographing apparatus to increase the frame rate of the output grayscale map and depth map, please see what is described later.

Of course, it should be noted that in the gesture recognizing process, the present disclosure does not specifically limit the photographing apparatus. The photographing apparatus is not limited to the structure described in the embodiment of the present disclosure, as long as it can output synchronously a pair of depth map and grayscale map corresponding to one photographing moment, and also can output a plurality of pairs of depth maps and grayscale maps corresponding to a plurality of photographing moments.

For example, in the step S20, according to the plurality of groups of images, obtaining spatial information by using the depth map in each group of images, and obtaining posture information for the gesture action object by using the grayscale map in each group of the images, to recognize a dynamic gesture change of the gesture action object.

For example, the spatial information includes a gesture region in the depth map, position information of the gesture action object, and the like.

For example, recognition of the dynamic gesture change is performed in the unit of a photographing apparatus. In other words, if one photographing apparatus is provided, that is, each group of images includes a pair of depth map and grayscale map, then the dynamic gesture change is recognized based on the plurality of groups of images; if a plurality of photographing apparatuses are provided, that is, each group of images includes a plurality of pairs of depth maps and grayscale maps, then based on a plurality of pairs of depth maps and grayscale maps respectively belonging to the plurality of groups of images and corresponding to the different photographing moments obtained by the same photographing apparatus, a gesture action change corresponding to the photographing apparatus is determined, and finally based gesture action changes corresponding to the plurality of photographing apparatuses, a final recognition result of gesture action change is obtained.

Therefore, the processing based on the images obtained by each photographing apparatus is the same. In the following, one photographing apparatus being provided is taken as an example, for example, a group of images includes one pair of depth map and grayscale map, to describe in detail a recognizing process of obtaining the gesture action change corresponding to the photographing apparatus.

For example, whether one photographing apparatus or a plurality of photographing apparatuses are provided, that is, whether each group of images includes one pair or a plurality of pairs of depth maps and grayscale maps, each pair of depth map and grayscale map is processed in the same way to obtain the posture information for the gesture action object corresponding to each pair of depth map and grayscale map.

For example, because the gesture action object is the object closest to the photographing apparatus, the depth map may be used to extract the spatial information, for example, a region closest to the photographing apparatus is extracted as a gesture region in the depth map, and the gesture region in the depth map is applied to the corresponding grayscale map to obtain a gesture analysis region in the grayscale map, to further obtain the posture information for the gesture action object according to the gesture analysis region.

The process of obtaining the posture information for the corresponding gesture action object based on a pair of depth map and grayscale map will be described in detail below.

For example, in the step S20, obtaining the spatial information by using the depth map in each group of images, may include: determining a gesture region in the depth map according to the depth map; for example, the spatial information includes the gesture region in the depth map.

For example, determining the gesture region in the depth map according to the depth map, may include: traversing the depth map, and counting depth data in the depth map, to build a depth histogram; selecting an adaptive depth threshold corresponding to the depth map; and determining the gesture region in the depth map, according to the adaptive depth threshold and the depth histogram.

In the depth map, an abscissa and an ordinate correspond to a pixel position, and a pixel grayscale value of each pixel position corresponds to a distance between the object corresponding to the pixel and the photographing apparatus, and each pixel in the depth map may represent three-dimensional coordinates of a point in the gesture interactive space.

For example, the depth data in the depth map is counted to build a depth histogram, and the depth histogram may reflect an occupancy rate of each depth value in the image. According to a depth distribution of different regions in the depth map, a local threshold is calculated, so for the different regions in the depth map, different thresholds may be adaptively calculated. For example, two adaptive thresholds in the depth map are calculated, and all pixels within the range of the two adaptive thresholds are determined as a gesture region in the depth map.

For example, in the step S20, obtaining the posture information for the gesture action object by using the grayscale map in each group of the images may include:

determining the posture information for the gesture action object corresponding to each group of images according to the gesture region in the depth map and the grayscale map.

For example, the posture information for the gesture action object corresponding to each group of images includes finger state information and position information.

For example, determining the posture information for the gesture action object corresponding to each group of images, according to the gesture region in the depth map and the grayscale map may include: applying the gesture region in the depth map to the grayscale map to obtain a gesture analysis region in the grayscale map; performing binary processing on the gesture analysis region to obtain a gesture connected domain; performing convex hull detection on the gesture connected domain to obtain the finger state information; and determining the position information based on the depth map.

For example, because the depth map and the grayscale map correspond to the same photographing moment, applying the gesture region in the depth image to the grayscale map includes: selecting a region of a same position in the grayscale map as the gesture analysis region, according to the gesture region in the depth map.

For example, fitting the largest inscribed circle of the gesture connected domain, locating a center of the largest inscribed circle as the gesture center, and expanding outward around the center, performing convex hull detection on the gesture connected domain to obtain the finger state information. For example, the convex hull detection may be implemented by using any feasible convex hull detection method, which is not specifically limited in the present disclosure.

For example, the finger state information includes whether there is a finger stretched out, and the number of fingers stretched out.

Figure 5A:
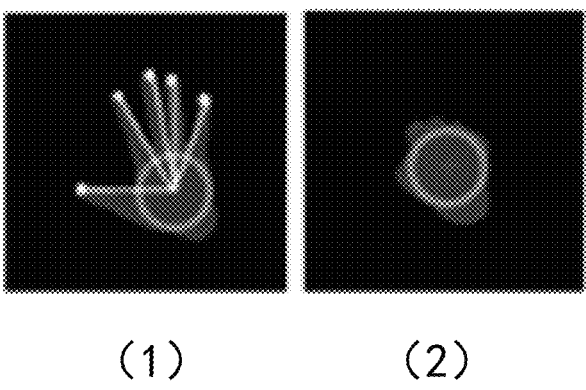
FIG. 5A is a schematic diagram of convex hull detection provided by at least one embodiment of the present disclosure.

FIG. 5A is a schematic diagram of convex hull detection provided by at least one embodiment of the present disclosure. For example, as shown in (1) on a left side of FIG. 5A, if the gesture action object is in a fully outstretched state of the finger, the finger state information obtained by the convex hull detection includes that there are fingers stretched out, and the number of fingers stretched out is 5. For example, as shown in (2) on a right side of FIG. 5A, if the gesture action object is in a first state, the finger state information obtained by the convex hull detection includes that there is no finger stretched out, and the number of fingers stretched out is 0.

For example, the position information includes a coordinate position of the gesture action object in the gesture interactive space. As described above, because the depth map and the grayscale map correspond to the same photographing moment, each pixel in the depth map may represent the three-dimensional coordinates of a point in the gesture interactive space. The three-dimensional coordinates may include an abscissa, an ordinate, and a depth coordinate of each pixel in the gesture interactive space, and the depth coordinate indicates a distance from the object corresponding to the pixel to the photographing apparatus. Because the photographing apparatus is generally arranged on a plane where the display unit is located, the depth coordinate also represents a distance between the object corresponding to the pixel and the display unit.

Therefore, the three-dimensional coordinate position of the gesture action object in the gesture interactive space may be obtained based on the depth map. Herein, the coordinate position of the gesture action object in the gesture interactive space includes the coordinate position of each pixel in the gesture analysis region.

FIG. 5B is a schematic diagram of a posture information extracting process provided by an embodiment of the present disclosure.

As shown in FIG. 5B, for a pair of depth map and grayscale map corresponding to the same photographing moment, traversing the depth map, and counting the depth data in the depth map to build a depth histogram. The depth histogram is shown in FIG. 5B.

Selecting two adaptive thresholds in the depth histogram (as shown by two vertical lines in the depth histogram in FIG. 5B), and all the pixels within the range of the two adaptive thresholds are determined as the gesture region in the depth map. The gesture region is applied to the grayscale map to obtain the gesture analysis region in the grayscale map as shown in FIG. 5B.

Performing binary process on the gesture analysis region to obtain the gesture connected domain, the gesture connected domain is shown in a gray region marked as "gesture connected domain" in FIG. 5B.

Performing convex hull detection on the gesture connected domain to obtain finger state information. For example, the finger state information includes that one and only one finger is in an outstretched state.

For example, based on the depth map, the position information of the gesture action object can also be determined. The specific process is as described above, and will not be repeated here.

After obtaining the posture information corresponding to a pair of depth map and grayscale map, determining a dynamic gesture change of the gesture object based on a plurality of groups of images respectively corresponding to different photographing moments obtained by continuously photographing the gesture action object by the photographing apparatus.

For example, in the step S20, recognizing the dynamic gesture change of the gesture action object may include: determining the dynamic gesture change of the gesture action object according to the posture information for the gesture action object respectively corresponding to the plurality of groups of images.

For example, determining the dynamic gesture change of the gesture action object according to the posture information for the gesture action object respectively corresponding to the plurality of groups of images may include: determining a finger outstretched state change and a position change of the gesture action object during a recognition period composed of the different photographing moments, according to the finger state information and the position information corresponding to the plurality of groups of images; and determining the dynamic gesture change of the gesture action object, according to the finger outstretched state change and the position change.

When performing gesture interaction, common interactive scenarios include clicking an icon, long-pressing an icon, sliding to switch scenes, grabbing a model to move, rotating, zooming, etc. Thus, five natural dynamic gestures commonly used by humans may be extracted, namely, a click gesture, a long-press gesture, a slide gesture, a grab gesture, and a release gesture.

For example, according to the finger state information and the position information corresponding to the plurality of groups of images, the finger outstretched state change and the position change of the gesture action object during the recognition period (i.e., a period when the dynamic gesture object is photographed) composed of the different photographing moments may be obtained.

For example, the dynamic gesture change of the gesture action object includes a gesture action, and the gesture action includes at least any one of the click gesture, the long-press gesture, the slide gesture, the grab gesture, and the release gesture.

For example, determining the dynamic gesture change of the gesture action object, according to the finger outstretched state change and the position change includes: determining that the gesture action is a click gesture, in response to the finger outstretched state change indicating that at least one finger of the gesture action object is in an outstretched state during at least part of time period of the recognition period, and the position change indicating that the depth coordinate of a target recognition point of the gesture action object decreases first and then increases during the at least part of time period.

For example, the target recognition point may be a fingertip of a target finger. For example, when one finger is in an outstretched state during at least part of the recognition period, this finger is the target finger; when a plurality of fingers are in the outstretched state during at least part of the recognition period, an index finger or a middle finger is preferentially selected as the target finger.

For example, during the recognition period, if one or more fingers are recognized as being in the outstretched state, and the depth coordinate of the fingertip of the target finger first decreases and then increases, it is determined that the gesture action object has performed a click gesture.

For example, determining the dynamic gesture change of the gesture action object, according to the finger outstretched state change and the position change, may include: determining that the gesture action is a long-press gesture, in response to the finger outstretched state change indicating that at least one finger of the gesture action object is in an outstretched state during at least part of time period of the recognition period, and the position change indicating that a depth coordinate of a target recognition point of the gesture action object decreases first and then is maintained during the at least part of time period, and a time length for the maintenance exceeding a first threshold.

Similarly, the target recognition point may be the fingertip of the target finger. For example, when one finger is in an outstretched state during at least part of the recognition period, this finger is the target finger; when a plurality of fingers are in the outstretched state during at least part of the recognition period, an index finger or a middle finger is preferentially selected as the target finger.

For example, during the recognition period, if one or more fingers are recognized as being in the outstretched state, the depth coordinate of the fingertip of the target finger decrease first and then is maintained, and a time length for maintaining exceeds the first threshold, it is determined that the gesture action object has performed a long-press gesture.

For example, determining the dynamic gesture change of the gesture action object, according to the finger outstretched state change and the position change, includes: determining that the gesture action is a slide gesture, in response to the finger outstretched state change indicating that at least one finger of the gesture action object is in an outstretched state during at least part of time period of the recognition period, and the position change indicating that a distance that a target recognition point of the gesture action object slides along a preset direction during the at least part of time period exceeds a second threshold, and the sliding distance is calculated based on the position information of the target recognition point of the gesture action object in the plurality of groups of images.

Similarly, the target recognition point may be the fingertip of the target finger. For example, when one finger is in an outstretched state during at least part of the recognition period, this finger is the target finger; when a plurality of fingers are in the outstretched state during at least part of the recognition period, an index finger or a middle finger is preferentially selected as the target finger.

For example, the preset direction may be a direction indicated by prompt information displayed on the display unit. For example, the preset direction may be a horizontal direction, a vertical direction, or a direction forming a certain angle with the horizontal direction, which is not specifically limited in the present disclosure.

For example, the second threshold may be a distance value in the gesture interactive space.

For example, a coordinate system where the control in the display unit is located has a preset mapping relationship with a coordinate system of the gesture interactive space, and the second threshold may be the distance value in the coordinate system where the control is located. At this time, according to the position information of the target recognition point of the gesture action object in the plurality of groups of images, mapping is performed according to the mapping relationship to obtain the sliding distance of the gesture action object in the coordinate system where the control is located, and then the sliding distance is compared with the second threshold.

For example, during the recognition period, if one or more fingers are recognized as being in the outstretched state, and a distance that the fingertip of the target finger slides along a preset direction (such as a distance to slide left and right in the horizontal direction, or a distance to slide up and down in the vertical direction) exceeds the second threshold, it is determined that the gesture action object performs a slide gesture.

For example, determining the dynamic gesture change of the gesture action object, according to the finger outstretched state change and the position change, includes: determining that the gesture action is a grab gesture, in response to the finger outstretched state change indicating that the gesture action object transitions from a state where at least one finger is stretched out to a state where no finger is stretched out during the recognition period.

For example, determining the dynamic gesture change of the gesture action object, according to the finger outstretched state change and the position change, includes: determining that the gesture action is a release gesture, in response to the finger outstretched state change indicating that the gesture action object transitions from a state where no finger is stretched out to a state where at least one finger is stretched out during the recognition period.

In order to reduce a possibility of misoperation of gesture recognition, during dynamic gesture recognition, it can be detected whether the gesture action object has a hover operation before performing the gesture action.

For example, determining the dynamic gesture change of the gesture action object, according to the finger outstretched state change and the position change, may further include: before determining the gesture action, determining whether the gesture action object has a still time exceeding a third threshold before an action change occurs; continuing to determine the gesture action in response to an existence of the still time exceeding the third threshold; and determining that no change in the gesture action has occurred, in response to an absence of the still time exceeding the third threshold.

That is to say, if it is detected that the gesture action object has a still time exceeding the third threshold before performing a click gesture, a long-press gesture, etc., it is continued to determine the specific gesture action performed by the gesture action object by means of the above method; if it is detected that the gesture action object does not have a still time exceeding the third threshold before performing a click gesture, a long-press gesture, etc., then it is determined that the gesture action object does not have a gesture action change, and the specific gesture action is no longer determined, so as to reduce a possibility of misrecognition.

It should be noted that, in the gesture recognizing method provided by at least one embodiment of the present disclosure, when determining the dynamic gesture change of the gesture action object, it is only necessary to determine whether the fingers are stretched out, and it is not necessary to determine which fingers are stretched out, which reduces a workload of convex hull detection and does not require support of complex deep learning algorithm, thereby improving a detection speed and reducing a demand for system computing power.

In the gesture recognizing method provided by at least one embodiment of the present disclosure, a simplified recognition algorithm for gesture action is designed, that is, a depth histogram is built to extract the gesture region in the grayscale map, the gesture connected domain is analyzed and convex hull detection is performed, and then the gesture action is recognized in combination with the finger outstretched state change and the position change, without using the complex deep learning algorithm, so that the rapid recognition of gesture action is implemented as a whole, and the time for recognizing the gesture action is less than or equal to 5 ms (milliseconds).

For example, the control itself also contains position information. When the gesture interaction action matches an expected target action, and the position of the gesture interaction coincides with the position of the control, the control is triggered. Therefore, in the gesture recognizing method provided in at least one embodiment of the present disclosure, the dynamic gesture change of the gesture action object further includes a gesture position, and the gesture action and the gesture position may be recognized synchronously.

For example, determining the dynamic gesture change of the gesture action object, according to the finger outstretched state change and the position change, further includes: in response to the gesture action being a click gesture, a long-press gesture or a slide gesture, determining that the gesture position is obtained based on position information of a target recognition point of the gesture action object, and the target recognition point comprises a fingertip of a target finger; and in response to the gesture action being a grab gesture or a release gesture, determining that the gesture position is obtained based on position information of a gesture center of the gesture action object, and the gesture center is a center of a largest inscribed circle of the gesture connected domain.

For example, when the recognized gesture action is a click gesture, a long-press gesture or a slide gesture, it is determined that the gesture position is a position of the target recognition point; for example, when the recognized gesture is a grab gesture or a release gesture, it is determined that the gesture position is a position of the gesture center.

For example, in order to achieve high-precision position measurement, such as depth measurement, positions of a plurality of preset sampling points near the gesture position may also be counted, and a final gesture position is located according to a surface precision, so as to improve accuracy and precision of the gesture position.

For example, determining that the gesture position is obtained based on the position information of a target recognition point in the gesture action object, may include: acquiring a plurality of position information respectively corresponding to a plurality of sampling points at preset positions around the target recognition point; and obtaining the gesture position according to the plurality of position information and the position information of the target recognition point.

For example, determining that the gesture position is obtained based on position information of a gesture center of the gesture action object, may include: acquiring a plurality of position information respectively corresponding to a plurality of sampling points at preset positions around the gesture center; and obtaining the gesture position according to the plurality of position information and the position information of the gesture center.

For example, selecting a plurality of sampling points around the gesture center or the target recognition point, and weighting the position information of these sampling points and the position information of the gesture center or the target recognition point to obtain a weighted result, and the weighted result is taken as the final gesture position.

Of course, because the position information includes the three-dimensional position, only the depth coordinate may be selected for calculation, so as to improve accuracy of depth position measurement while reducing an amount of calculation.

For example, in some embodiments, when a plurality of photographing apparatuses are provided, the step S20 may include: based on a plurality of pairs of depth maps and grayscale maps respectively belonging to the plurality of groups of images and corresponding to the different photographing moments obtained by a same photographing apparatus, determining an intermediate gesture change of the gesture action object corresponding to the same photographing apparatus; and weighting and filtering a plurality of intermediate gesture changes respectively corresponding to the plurality of photographing apparatuses to obtain the dynamic gesture change of the gesture action object.

For example, at this time, the plurality of photographing apparatuses are used to synchronously locate the gesture action and the gesture position, and each photographing apparatus uses a plurality of pairs of depth maps and grayscale maps corresponding to different photographing moments obtained by the photographing apparatus to obtain the gesture change of the gesture action object corresponding to the photographing apparatus. The specific recognizing process is as described above, and will not be repeated here. Afterwards, in combination with the recognition results of the plurality of photographing apparatuses, weighting correction, bandpass filter correction and other processing are performed to obtain the final recognition result.

For example, in some other embodiments, the gesture position may be located using the results of the plurality of photographing apparatuses, and the gesture action recognized by one of the photographing apparatuses may be selected as the recognition result of the gesture action, so as to improve precision of gesture position positioning and reduce the amount of calculation.

Because the plurality of photographing apparatuses have different photographing angles and/or photographing positions, this method can guarantee that the gesture is not blocked to a certain extent, improve accuracy of the final recognition result, enhances robustness of dynamic gesture recognition, and achieves high-precision measurement.

For example, in some other embodiments, it is also possible to integrate the gesture connected domains of the plurality of photographing apparatuses (such as weighting correction or bandpass filtering, etc.) in the posture information acquiring stage to obtain a final gesture connected domain, and perform a subsequent dynamic gesture recognition using this gesture connected domain. The recognizing process is the same as the above-mentioned process, and will not be repeated here. This method can also improve the accuracy and robustness of gesture recognition results.

Therefore, by setting up a plurality of photographing apparatuses, the accurate positioning of the gesture position and the accurate recognition of the gesture action are implemented as a whole. After actual measurement, a positioning error of the gesture position is less than 2 mm (millimeter), and a recognition accuracy of the gesture action is greater than 95%.

By using the above method, position detection and action recognition of the gesture may be implemented simultaneously. After actual measurement, the processing time is within 5 ms, which is only a quarter of the time (20 ms and above) required for gesture recognition combined with the deep learning method commonly used at present, and this method requires little system computing power. Moreover, the gesture recognizing method provided by at least one embodiment of the present disclosure can be implemented using an image processing method that requires less computing power, which is conducive to hardwareization of the algorithm. In addition, the various dynamic gestures defined are more in line with natural interaction needs of humans. While reducing the amount of calculation, it can ensure a real-time performance of gesture interaction and improve user experience.

As described above, although the existing depth camera (such as a binocular camera, a structured light camera, and a TOF camera) can obtain depth information, it has a high processing cost, a low frame rate, and a large delay, which will affect the user's experience in real-time interaction.

Therefore, in the gesture recognizing method provided by at least one embodiment of the present disclosure, in order to meet the real-time interaction requirements of high precision, low delay, and large viewing angle, based on a structural arrangement scheme of a depth camera or a depth camera combining with a high-speed grayscale camera, and a customized parallel processing flow, the rapid detection of a dynamic gesture change may be implemented through a combination of fast and slow speeds and a trajectory prediction.

For example, obtaining a plurality of groups of images respectively corresponding to the different photographing moments, by using at least one photographing apparatus to continuously photograph the gesture action object, includes: using each photographing apparatus to continuously photograph the gesture action object to obtain a plurality of pairs of depth maps and grayscale maps respectively corresponding to the different photographing moments output by the photographing apparatus.

For example, each photographing apparatus includes a first acquiring unit, for example, the first acquiring unit is a TOF camera.

For example, FIG. 6 shows a relationship between a depth map and a grayscale map of the TOF camera. Referring to what is described above, each first frame represents a time of a DCS phase, that is, DCS0, DCS1, DCS2, DCS3 and so on in FIG. 6. DCS0, DCS1, DCS2, and DCS3 respectively represent different phases. For example, DCS0 corresponds to a phase of 0°, DCS1 corresponds to a phase of 90°, DCS2 corresponds to a phase of 180°, and DCS3 corresponds to a phase of 270°. Herein, the "phase" represents a phase difference between a transmitted signal and a received signal of the first acquiring unit. For example, DCS0 indicates that the acquired grayscale image corresponds to a phase difference of 0° between the transmitted signal and the received signal of the first acquiring unit.

For example, in FIG. 6, the TOF camera use four grayscale maps corresponding to four different phases to calculate a depth map, i.e., N=4 at this moment. Of course, it should be noted that FIG. 6 only provides an example, and in other embodiments, N may also take other values, such as 2 or 8.

As shown in FIG. 6, in frame1 including four DCSs, that is, four first frames, four grayscale maps corresponding to four different phases are respectively acquired in each DCS, and are expressed as grayscale maps Gray0, Gray1, Gray2, and Gray3. A depth map Dep0 is calculated based on the grayscale maps Gray0, Gray1, Gray2, and Gray3. The depth map Dep0 and the grayscale map Gray3 may be synchronously output by the first acquiring unit.

As shown in FIG. 6, in frame2 including four DCSs, that is, four first frames, four grayscale maps corresponding to four different phases are respectively acquired in each DCS, and are expressed as grayscale maps Gray4, Gray5, Gray6, and Gray7. A depth map Dep1 is calculated based on grayscale maps Gray4, Gray5, Gray6, and Gray7. The depth map Dep1 and the grayscale map Gray7 may be synchronously output by the first acquiring unit.

A calculation process of a depth map Dep2 is the same as the aforementioned process, which will not be repeated here.

As described above, when a frame length of the first frame is 25 ms, the first acquiring unit outputs a pair of depth map and grayscale map every 100 ms, and the grayscale map and the depth map have the same output frame rate and delay, but at this moment, a delay requirement of 10 ms or less cannot be achieved. Therefore, in order to increase the frame rate of the grayscale map and the depth map output by the photographing apparatus, some embodiments of the present disclosure provide various implementation solutions as follows.

For example, in some embodiments, obtaining a plurality of pairs of depth maps and grayscale maps respectively corresponding to the different photographing moments output by the photographing apparatus, by using each photographing apparatus to continuously photograph the gesture action object, may include: outputting a pair of corresponding depth map and grayscale map in every first frame by using the photographing apparatus, and the output depth map is obtained by fitting and predicting a smooth trajectory according to the N grayscale maps and the depth map.

That is to say, at this time, the photographing apparatus may output one pair of corresponding depth map and grayscale map in every first frame, the output depth maps are obtained by fitting and predicting a smooth trajectory according to the N grayscale maps and the depth map, that is, the output depth maps are calculated based on the N grayscale maps.

FIG. 7A is a schematic diagram of a corresponding relationship between a depth map and a grayscale map provided by an embodiment of the present disclosure.

Referring to FIG. 6, every four grayscale maps corresponding to different phases corresponds to a depth map, that is, the first acquiring unit aligns with the depth map every four first frames to implement position calibration of depth information and grayscale information.

For example, in DCS0, DCS1, DCS2 and DCS3 of frame1, any feasible prediction algorithm may be applied to fit and predict a smooth trajectory for the depth map Dep0 through the grayscale maps Gray0, Gray1, Gray2, and Gray3, to obtain a depth map Dep0_1 corresponding to the grayscale map Gray0, a depth map Dep0_2 corresponding to the grayscale map Gray1, and a depth image Dep0_3 corresponding to the grayscale image Gray2, so as to improve the frame rate of the depth information.

For example, in DCS0, DCS1, and DC2 of frame2, any feasible prediction algorithm can be applied to fit and predict a smooth trajectory for the depth map Dep1 through the grayscale maps Gray4, Gray5, Gray6, and Gray7, to obtain a depth map Dep1_1 corresponding to the grayscale map Gray4, a depth map Dep1_2 corresponding to the grayscale map Gray5, and a depth image Dep1_3 corresponding to the grayscale map Gray6, so as to improve the frame rate of the depth information.

A processing procedure in frame3 is the same as the aforementioned process, which will not be repeated here.

For example, the prediction algorithm may include an interpolation algorithm, a Kalman filter algorithm, etc., which are not specifically limited in the present disclosure.

Thus, the first acquiring unit may output a pair of corresponding grayscale map and depth map in each first frame.

It should be noted that it is also possible to calculate depth maps corresponding to some grayscale maps that currently do not have corresponding depth maps, for example, to calculate a depth map corresponding to the grayscale map Gray 1 and a depth map corresponding to the grayscale map Gray5, to output a pair of corresponding depth map and grayscale map every two first frames. The present disclosure is not limited to outputting a pair of corresponding depth map and grayscale map in each first frame, as long as the frame rate of the depth map can be increased.

In these embodiments, the frame rate of the depth map and the grayscale map output by the photographing apparatus can reach the frame rate of the grayscale map obtained in the first acquiring unit, the delay can reach the frame length of one first frame, without an additional grayscale camera, saving hardware cost.

In the foregoing embodiments, the precision of the predicted depth map is limited by the precision of the prediction algorithm, and when N is large, the prediction precision of the depth map may be reduced. Therefore, the gesture recognizing method provided by at least one embodiment of the present disclosure also provides another way to obtain a depth map and a grayscale map. Referring to FIG. 6, a depth map is generated by using the grayscale maps of every four first frames. Since the four phases change periodically, for example, 0°, 90°, 180°, 270°, 0°, 90°, . . . , four grayscale maps with different phases may be selected to operate together to obtain a new depth map.

For example, in some other embodiments, obtaining a plurality of pairs of depth maps and grayscale maps respectively corresponding to the different photographing moments output by the photographing apparatus, by using each photographing apparatus to continuously photograph the gesture action object, may include: outputting a pair of corresponding depth map and grayscale map in at most every N−1 first frames by using the photographing apparatus, wherein for one pair of corresponding depth map and grayscale map output in a same frame, the output depth map is obtained based on grayscale maps of N−1 first frames adjacent to the output grayscale map, and the output grayscale map and the grayscale maps of the N−1 first frames correspond to N different phases.

That is to say, at this time, the photographing apparatus may output a pair of corresponding depth map and grayscale map in at most every N−1 first frames, the output depth map is obtained based on the grayscale maps of N−1 first frames adjacent to the first frame at which the grayscale map corresponding to the output depth map is output, and the output grayscale map and the adjacent grayscale maps of the N−1 first frames correspond to the N different phases.

FIG. 7B shows a schematic diagram of a corresponding relationship between a depth map and a grayscale map provided by another embodiment of the present disclosure.

As shown in FIG. 7B, the depth map Dep0 is calculated based on the grayscale maps Gray0, Gray1, Gray2 and Gray3 corresponding to four different phases; the depth map Dep1_1 is calculated based on the grayscale maps Gray1, Gray2, Gray3, and Gray4 corresponding four different phases; the depth image Dep1_2 is calculated based on the grayscale images Gray2, Gray3, Gray4, and Gray5 corresponding to four different phases, . . . , and so on.

That is to say, in FIG. 7B, one pair of depth map and grayscale map is output in every first frame. For example, taking a case of outputting the depth map Dep1_1 and the grayscale map Gray4 in one first frame as an example, the depth map Dep1_1 is obtained based on three grayscale maps adjacent to the grayscale map Gray4, the three grayscale maps are obtained before the grayscale map Gray4, and the three grayscale images are grayscale images Gray1, Gray2, and Gray3; the grayscale maps Gray1, Gray2, Gray3 and Gray4 respectively correspond to four different phases. Thus, a depth map is obtained by calculating the grayscale maps corresponding to four different phases.

Of course, what is shown in FIG. 7B is for illustration. When N takes different values, the depth map corresponding to the grayscale map may be calculated in a similar mode.

It should be noted that it is also possible to calculate depth maps corresponding to some grayscale maps, for example, to calculate a depth map corresponding to Gray5, and a depth map corresponding to Gray7, etc., and to output a pair of corresponding depth map and grayscale map every two first frames. Therefore, the present disclosure is not limited to outputting a pair of corresponding depth map and grayscale map in every first frame, as long as the frame rate of the depth map can be increased, that is, a pair of corresponding depth map and grayscale map may be output in at most every N−1 first frames.

In the foregoing embodiment, the frame rate of the depth map and the grayscale map output by the photographing apparatus can reach a frame rate of the grayscale map acquired in the first acquiring unit, and the delay can reach the frame length of the first frame without an additional grayscale camera, saving hardware cost. Moreover, the precision of the depth map obtained in this way is not affected by the prediction algorithm, and even if N is large, the image precision of the depth map can be kept relatively good.

In the above mode, it is possible to improve the frame rate of the photographing apparatus and reduce a processing delay of gesture recognition without adding a grayscale camera. However, in this mode, the grayscale map and the depth map need to share the same transmission bandwidth, so if the frame rate is relatively high, the transmission delay may be high, and the frame rate is limited by the frame rate of the grayscale map acquired in the first acquiring unit.

Therefore, in some other embodiments, the photographing apparatus may further include a second acquiring unit; for example, the second acquiring unit includes a high-speed grayscale camera, and ultra-high-speed depth information prediction and calibration may be implemented through a high frame rate of the high-speed grayscale camera.

For example, using each photographing apparatus to continuously photograph the gesture action object to obtain a plurality of pairs of depth maps and grayscale maps respectively corresponding to the different photographing moments output by the photographing apparatus, may include: outputting a pair of corresponding depth map and grayscale map in at most every M−1 second frames by using the photographing apparatus; the output depth map includes a reference depth map, or a depth map obtained by fitting and predicting a smooth trajectory based on the reference depth map and at least one grayscale map corresponding to the reference depth map; the reference depth map includes a depth map output by the first acquiring unit at a current second frame or before the current second frame, the current second frame is a second frame outputting the pair of corresponding depth map and grayscale map, and the at least one grayscale map includes a grayscale map output by the second acquiring unit between the second frame corresponding to the reference depth map and the current second frame.

That is to say, at this time, the photographing apparatus may output a pair of corresponding depth map and grayscale map in at most every M−1 second frames. In addition, the output depth map may be a reference depth map, or a depth map obtained by fitting and predicting a smooth trajectory based on the reference depth map and at least one grayscale map corresponding to the reference depth map. Herein, the reference depth map includes a depth map output by the first acquiring unit at a current second frame or before the current second frame, the current second frame is a second frame outputting the pair of corresponding depth map and grayscale map, and the at least one grayscale map includes a grayscale map output by the second acquiring unit between the second frame corresponding to the reference depth map and the current second frame.

Of course, according to different prediction algorithms, it is also possible to predict by using more grayscale maps combined with the reference depth map. For example, when there is no corresponding depth map for the current second frame, the grayscale map output in M second frames prior to the current second frame may be used, combined with the reference depth map and processed by using a prediction algorithm or an interpolation algorithm to obtain the depth map corresponding to the current second frame.

For example, because the frame rate of the grayscale map output by the second acquiring unit is M times the frame rate of the depth map output by the first acquiring unit, the second acquiring unit can align once with the depth map output by the first acquiring unit every M second frames, to implement position calibration of the depth and grayscale information. In the other second frames, using the prediction algorithm, the high frame rate grayscale map obtained by the second acquiring unit is used to fit and predict a smooth trajectory for the depth map, that is to say, in the other M−1 second frames, even if there is no depth map, it is still possible to implement the prediction of the depth map through the grayscale map output by the second acquiring unit, thereby implementing the acquisition and calibration of the high-speed image depth information.

It should be noted that a corresponding pair of grayscale map and depth map may be output in every second frame, or a corresponding pair of grayscale map and depth map may be output in every two second frames, which is not specially limited in the present disclosure, as long as the output frame rate of the depth map can be increased, that is, a pair of corresponding depth map and grayscale map may be output in at most every M−1 first frames.

Hereinafter, the specific processing procedure of the photographing apparatus at this time will be described in detail in conjunction with the accompanying drawings.

Figure 7C:
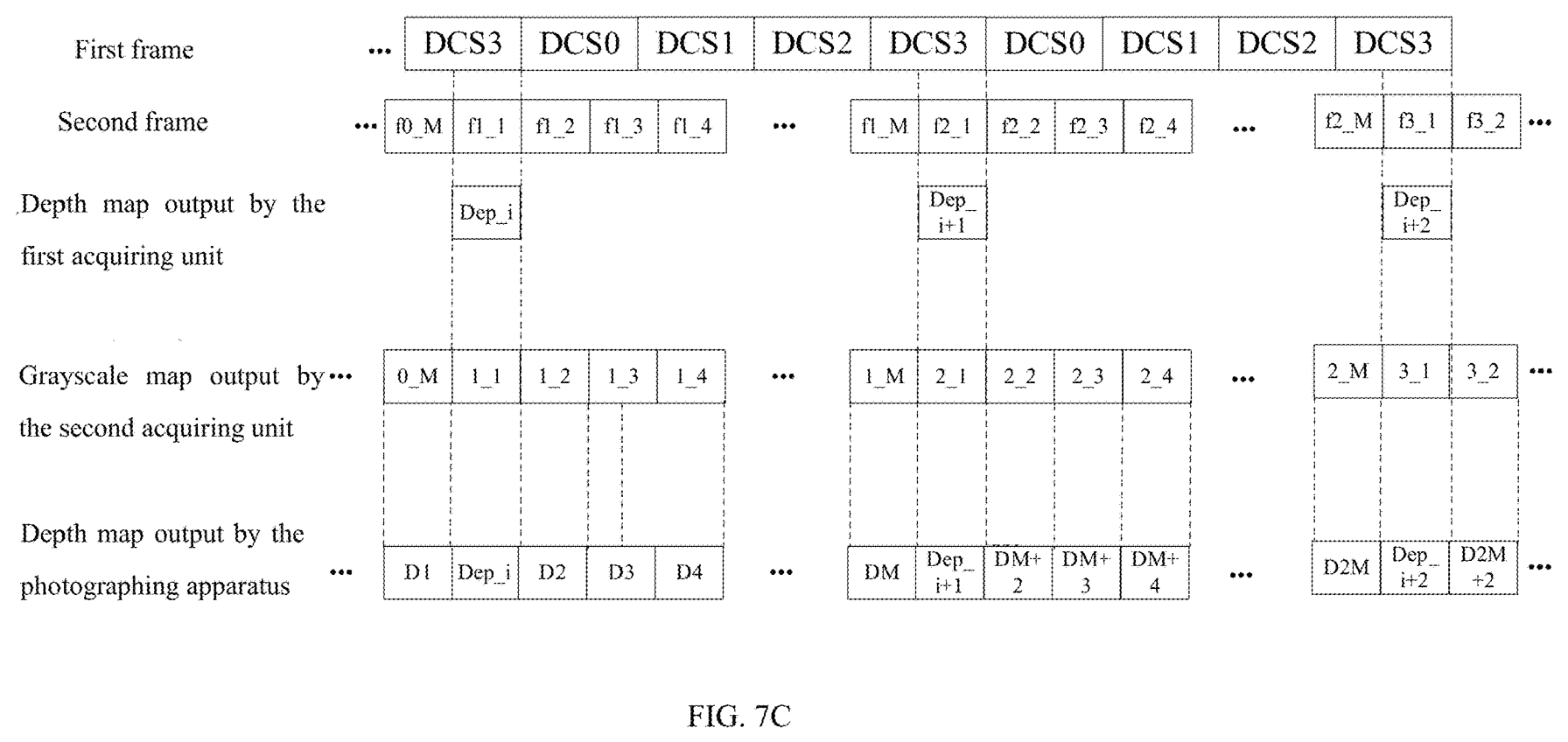

FIG. 7C is a schematic diagram of a corresponding relationship between a depth map and a grayscale map provided by yet another embodiment of the present disclosure.

For example, in FIG. 7C, DCS0, DCS1, DCS2, and DCS3 respectively represent the first frames corresponding to different phases; and f0_M, f1_1, f1_2, . . . , f1_M, f2_1, . . . , f2_M, f3_1, f3_2 . . . represent the second frame, respectively.

For example, as shown in FIG. 7C, the first acquiring unit is configured to output a depth map every M second frames, where M is a positive integer greater than 1. For example, the first acquiring unit outputs a depth map Dep_i in the second frame f1_1, outputs a depth map Dep_i+1 in the second frame f2_1, and outputs a depth map Dep_i+2 in the second frame f3_1. For the calculating process of the depth maps Dep_i, Dep_i+1, and Dep_i+2, reference may be made to the foregoing embodiments, which will not be repeated here.

As shown in FIG. 7C, the second acquiring unit is configured to output a grayscale map in each second frame, for example, output a grayscale map 1_1 in the second frame f1_1, output a grayscale map 1_2 in the second frame f1_2, and output a grayscale map 1_3 in the second frame f1_3, and so on.

A frame length of the second frame is shorter than a frame length of the first frame; for example, the frame length of the first frame is 25 ms, and the frame length of the second frame is 8.3 ms.

The following takes the process of outputting the depth map from the second frame f1_1 to the second frame f1_M as an example to illustrate the process of acquiring the depth map.

It should be noted that, for the depth maps output from the second frame f1_1 to the second frame f1_M, the reference depth map is the depth map Dep_i output by the first acquiring unit, and the reference depth map Dep_i is obtained by calculating the grayscale maps respectively corresponding to four different phases obtained at four first frames, the depth map Dep_i is aligned with the grayscale map 1_1 output by the second acquiring unit, and both are output to the photographing apparatus synchronously in the second frame 1_1.

When the current second frame is the second frame f1_2, the reference depth map Dep_i and the grayscale maps 1_1, 1_2 are used, combined with the prediction algorithm, to predict the depth map D2 of the second frame f1_2, and the depth map D2 and the grayscale map 1_2 are output simultaneously to the photographing apparatus.

When the current second frame is the second frame f1_3, the reference depth map Dep_i and the grayscale maps 1_1, 1_2, and 1_3 are used, combined with the prediction algorithm, to predict the depth map D3 of the second frame f1_3, and the depth map D3 and the grayscale map 1_3 are output synchronously to the photographing apparatus.

It goes in a similar way, and a subsequent process will not be repeated.

Because the frame rate of the high-speed grayscale camera can reach up to several hundred Hz, in the foregoing embodiments, a combination of the high-speed grayscale camera and the depth camera can achieve a low delay at a millisecond level, which greatly reduces the delay required for image acquisition, improves the frame rate for image acquisition, quickly implements judgment of gesture action and gesture position, and increases the speed of interactive experience in 3D space.

In this embodiment, the precision of the predicted depth map is limited by the precision of the prediction algorithm, and when M is large, the prediction precision of the depth map may be reduced. Therefore, it is possible to first use the grayscale maps with different phases as described above to obtain the depth map corresponding to each first frame, and then to predict using the depth map obtained from each first frame to reduce the gap between images during prediction, and to improve the accuracy of the predicted depth map.

For example, the first acquiring unit is further configured to obtain a pair of corresponding depth map and grayscale map in every first frame, the depth map is obtained by calculating the grayscale maps of N−1 first frames adjacent to the obtained grayscale image, the obtained grayscale map and the grayscale maps of the N−1 first frames correspond to N different phases, and a frame length of the first frame is greater than a frame length of the second frame, where N is a positive integer greater than 1. For the specific processing procedure of the depth map output by the first acquiring unit, reference may be made to the description of the related embodiment in FIG. 7B, which will not be repeated here.

At this time, the first acquiring unit may obtain a pair of corresponding depth map and grayscale map in each first frame, the depth map is obtained by calculating the grayscale maps of N−1 first frames adjacent to the obtained grayscale image, the obtained grayscale map and the grayscale maps of the N−1 first frames correspond to N different phases. The second acquiring unit may output a pair of corresponding depth map and grayscale map in at most every M'−1 second frames, for example, the output depth map includes a reference depth map, or a depth map obtained by fitting and predicting a smooth trajectory based on the reference depth map and at least one grayscale map corresponding to the reference depth map.

For example, referring to the related embodiment in FIG. 7B, in any first frame, if the first frame does not have a corresponding depth map, a grayscale map output from N−1 first frames adjacent to the first frame and before the first frame is used to calculate the depth map corresponding to the first frame, and the specific process will not be repeated here.

In this way, a depth map is obtained by the first acquiring unit in each first frame, and the frame rate of the depth map output by the first acquiring unit is the same as the frame rate of the grayscale map obtained by the first acquiring unit.

At this time, because the frame rate of the grayscale map output by the second acquiring unit is M' times the frame rate of the depth map output by the first acquiring unit, the second acquiring unit can align with the depth map output by the first acquiring unit every M' second frames, to implement the position calibration of depth information and grayscale information. In other second frames, by using the prediction algorithm, a smooth trajectory for the depth map output by the first acquiring unit is fitted and predicted through the high frame rate grayscale map obtained by the second acquiring unit, that is to say, in the other M'−1 second frames, even if there is no depth map, the grayscale map output by the second acquiring unit may be used to implement the prediction of the depth map, thereby implementing the acquisition and calibration of high-speed image depth information.

Here, M' is a positive integer, and M'=M/N, and M indicates a ratio of the frame rate of the grayscale map output by the second acquiring unit to the frame rate of the depth map output by the first acquiring unit, when the first acquiring unit outputs a depth map every N first frames.

For the specific process of prediction, reference may be made to what is described in FIG. 7C, which will not be repeated.

Since the frame rate of the high-speed grayscale camera can reach up to several hundred Hz, in the foregoing embodiments, the combination of the high-speed grayscale camera and the depth camera can achieve a low delay of millisecond level, which greatly reduces the delay required for image acquisition, increases the frame rate of image acquisition, quickly implements the judgment of gesture action and gesture position, and increases the speed of interactive experience in 3D space.

Moreover, an interval between the reference depth maps used for prediction is shortened at this time, for example, in the embodiment described in FIG. 7C, the interval between the reference depth maps is four first frames, while in this embodiment, the interval between the reference depth maps is shortened to one first frame, so the accuracy of prediction is improved, an interpolation factor is reduced, and the precision of the predicted depth map is improved.

Therefore, in the gesture recognizing method provided in at least one embodiment of the present disclosure, the frame rate of the grayscale map and the depth map output by the photographing apparatus is greatly increased, which reduces the delay of the image acquisition process and meets the low-latency interaction requirements. For example, when a combination of a high-speed grayscale camera with a frame rate of 120 fps and a TOF camera with a frame rate of 30 fps are used as the photographing apparatus for photographing, the specific indicators obtained in the test include: a delay within 20 ms, a reporting rate of 120 Hz, a positioning precision within 2 mm, and a recognition rate above 95%. Therefore, the gesture recognizing method provided by at least one embodiment of the present disclosure can quickly and accurately locate the gesture position and gesture action, ensure smoothness and accuracy of the interaction process, and improve user experience.

At least one embodiment of the present disclosure further provides an interactive method. FIG. 8 is a schematic flow chart of an interactive method provided by at least one embodiment of the present disclosure.

As shown in FIG. 8, the interactive method provided by at least one embodiment of the present disclosure includes at least steps S30-S50.

In step S30, displaying a control.

For example, the control (visual component displayed on the display unit) may be displayed on a display unit, and the display unit includes any display device with a display effect, such as a 3D display, a large-sized screen, and the like. The display unit MAY display a display content that interacts with a gesture action object. For example, the display content includes a common and easy-to-understand control component. For the display unit and the display control component, reference may be made to what is described above, which will not be repeated here. It should be noted that the present disclosure does not limit the type, shape, and performance of the display unit, nor does it specifically limit the number, material, color, and shape of the control.

In step S40, recognizing a dynamic gesture change when the user performs a target action.

For example, the photographing apparatus is integrated near the display unit and faces the user. For example, the user performs the target action according to the information indicated by the displayed content or other information. The photographing apparatus continuously photographs a process of the user performing the target action and recognizes a dynamic gesture change when the user performs the target action by using the gesture recognizing method described in any embodiment of the present disclosure.

For the gesture recognizing method, please refer to what is described above, which will not be repeated here.

In step S50, triggering the control according to the dynamic gesture change recognized and the target action.

For example, in some embodiments, the dynamic gesture change includes a gesture action, and the gesture action includes, for example, any one of a click gesture, a long-press gesture, a slide gesture, a grab gesture, and a release gesture.

For example, the step S50 may include: triggering a control and displaying a visual feedback effect in response to the user's gesture action being consistent with the target action.

For example, at this time, by using the gesture recognizing method provided by any embodiment of the present disclosure, recognizing the dynamic gesture change performed by the user, for example, it is detected that the gesture action is a click gesture; if the target action is also a click gesture, the control is trigged and a visual feedback effect is displayed, for example, a change in material, color, brightness, and the like of the control, or any other visual feedback effect are displayed, to remind the user that the interaction is complete.

For example, the visual feedback effect may also include scene switching, spatial movement, rotation, zooming, etc. according to different gestures, which is not specifically limited in the present disclosure.

For example, in some other embodiments, the dynamic gesture change also includes a gesture position, and the control itself also includes position information; the control may only be triggered when the position of gesture interaction coincides with the position of the control.

For example, the step S50 may include: triggering the control and displaying a visual feedback effect, in response to the user's gesture action being consistent with the target action, and the user's gesture position matching a control position of the control. Herein, the user's gesture position matching the control position of the control means that a position, which the gesture position is mapped to according to a mapping relationship in the coordinate system where the control is located, is consistent with the control position.

As described above, the coordinate system where the control is located and the coordinate system in the gesture interactive space where the gesture position is located has a predetermined mapping relationship. The gesture position is mapped to the coordinate system where the control is located according to the mapping relationship. If the two positions coincide, the control is triggered and the visual feedback effect is displayed.

At least one embodiment of the present disclosure further provides a gesture interactive system. FIG. 9 is a schematic block diagram of a gesture interactive system provided by at least one embodiment of the present disclosure.

As shown in FIG. 9, the gesture interactive system includes one or more photographing apparatus 901, a gesture recognizing unit 902, and a display unit 903.

For example, at least one photographing apparatus 901 is configured to continuously photograph a gesture action object, to acquire a plurality of groups of images taken respectively at different photographing moments for the gesture action object.

The gesture recognizing unit 902 is configured to receive the plurality of groups of images, perform the gesture recognizing method described in any embodiment of the present disclosure, and output a recognition result of the dynamic gesture change of the gesture action object.

The display unit 903 is configured to receive the recognition result, and display an interactive effect according to the recognition result.

For example, the gesture recognizing unit 902 includes a Digital Signal Processor (DSP), that is, the gesture recognizing method provided by at least one embodiment of the present disclosure is performed in a multi-path DSP, which outputs the recognition result of the dynamic gesture change of the gesture action object according to the plurality of groups of images.

For example, the process of obtaining a grayscale map and a depth map with a high frame rate in the photographing apparatus may also be implemented in hardware, such as in a digital signal processor.

For example, in some embodiments, the photographing apparatus acquires raw data and transmits the raw data to the gesture recognizing unit, and the gesture recognizing unit completes reading of the raw data, SIP processing, gesture positioning and recognizing, timing control and many other functions.

In a conventional solution, usually image preprocessing is performed in a dedicated processing chip or a host computer, and at the same time gesture recognition is performed on the host computer based on a deep learning algorithm, which takes up a lot of system resources. The image processing method used in the gesture recognizing method provided by at least one embodiment of the present disclosure is easy to implement, and the algorithm can be implemented in hardware, both image signal processing and dynamic gesture recognition are executed in a DSP, which saves system resources, quickly and accurately locates a gesture position and a gesture action, so as to ensure smoothness and accuracy of the interaction process.

For example, gesture acquisition and dynamic gesture recognition are all completed in a slave computer, and the recognition result is directly reported to the display unit via a preset interface (such as a USB interface), so that the display unit may display a corresponding interactive effect corresponding to certain content. As a result, the processing workload of the host computer is reduced, the processing efficiency of the system is improved, and the processing delay is reduced to ensure the real-time performance of gesture recognition; and the limited resources of the host computer may be used for the display of the interactive effect to improve user experience.

For example, the recognition result includes a gesture position, that is, three-dimensional coordinates of a gesture action object in the gesture interactive space. For example, the recognition result may also include a gesture action. For example, the gesture action is transmitted to the display unit according to a preset marking code; for example, a click gesture corresponds to "1", a long-press gesture corresponds to "2", and so on. Certainly, the gesture action may also be transmitted to the display unit according to other preset corresponding relationships, which is not specifically limited in the present disclosure.

For example, the display unit may include a host computer, and the display unit may utilize the host computer in combination with display content to develop interactive effects. Due to a fast processing speed of the slave computer, such a setting mode can improve the processing efficiency of the system as a whole, maximize the use of system resources, reduce the processing delay, and realize the real-time gesture interaction.

For example, the gesture interactive system includes a plurality of photographing apparatuses 901 configured to synchronously photograph the gesture action object from different angles, so as to obtain a plurality of pairs of corresponding depth maps and grayscale maps at a same photographing moment.

For example, the plurality of photographing apparatuses 901 are arranged around the display unit and facing the user, for example, arranged at a center of an upper edge, a lower edge, a left edge or a right edge of a display screen.

For example, each photographing apparatus includes a first acquiring unit and a second acquiring unit, and the first acquiring unit and the second acquiring unit are configured to synchronously photograph the gesture action object. For example, the first acquiring unit is a TOF camera, and the second acquiring unit is a high-speed grayscale camera.

For example, when a plurality of photographing apparatuses are provided, the plurality of photographing apparatuses photograph the gesture action object synchronously, and the first acquiring unit and the second acquiring unit included in each photographing apparatus also photograph the gesture action object synchronously, so as to obtain a plurality of pairs of depth maps and grayscale maps corresponding to the same photographing moment.

For the specific setting and processing of the first acquiring unit, the second acquiring unit, and the photographing apparatus, please refer to the foregoing embodiments, which will not be repeated here.

For example, the gesture interactive system can intelligently call a corresponding photographing apparatus according to the gesture position, control an exposure timing of a plurality of cameras, and acquire a plurality of pairs of depth maps and grayscale maps at one photographing moment. For example, the plurality of photographing apparatuses are configured to select some or all of the photographing apparatuses to photograph the gesture action object according to the position of the gesture action object in the gesture interaction space.

For example, if it is detected that the gesture position is located at an upper left corner of the display unit, the photographing apparatus located near a lower right corner of the display unit may be configured not to photograph the gesture action object, so as to reduce system resource consumption and hardware overhead.

FIG. 10 is a schematic block diagram of a gesture recognizing unit provided by at least one embodiment of the present disclosure.

As shown in FIG. 10, the gesture recognizing unit 902 may include: an image acquiring module 9021 and a processing module 9022.

For example, these modules may be implemented by a hardware (such as circuit) module, a software module, or any combination thereof, which is the same in the following embodiments, and will not be repeated here. For example, as described above, these modules can be implemented using a DSP, or can be implemented by a central processing unit (CPU), a graphics processing unit (GPU), a tensor processing unit (TPU), a field programmable logic gate array (FPGA) or other forms of processing units with data processing capabilities and/or instruction executing capabilities as well as corresponding computer instructions.

For example, the image acquiring module 9021 is configured to acquire a plurality of groups of images taken at different photographing moments for the gesture action object. For example, each group of images includes at least one pair of corresponding depth map and grayscale map.

For example, the processing module 9022 is configured to, according to the plurality of groups of images, obtain spatial information by using the depth map in each group of images, and obtain posture information for the gesture action object by using the grayscale map in each group of the images, to recognize a dynamic gesture change of the gesture action object.

For example, the image acquiring module 9021 and the processing module 9022 may include codes and programs stored in a memory; a processor may execute the codes and programs to implement some or all functions of the image acquiring module 9021 and the processing module 9022 as described above. For example, the image acquiring module 9021 and the processing module 9022 may be dedicated hardware devices, which are used to implement some or all of the functions of the image acquiring module 9021 and the processing module 9022 as described above. For example, the image acquiring module 9021 and the processing module 9022 may be a circuit board or a combination of a plurality of circuit boards, which are used to implement the functions described above. In the embodiment of the present disclosure, the circuit board or the combination of the plurality of circuit boards may include: (1) one or more processors; (2) one or more non-transitory memories connected to the processor(s); and (3) a processor-executable firmware stored in the memory.

It should be noted that the image acquiring module 9021 may be used to implement the step S10 shown in FIG. 3, and the processing module 9022 may be used to implement the step S20 shown in FIG. 3. Therefore, for the specific description of the functions that can be implemented by the image acquiring module 9021 and the processing module 9022, reference can be made to the relevant descriptions of the steps S10 to S20 in the above embodiment of the gesture recognizing method, which will not be repeated. In addition, the gesture recognizing unit 902 can achieve technical effects similar to the aforementioned gesture recognizing method, which will not be repeated here.

It should be noted that, in the embodiment of the present disclosure, the gesture recognizing unit 902 may include more or less circuits or units, and the connection relationship between respective circuits or units is not limited, which may be determined according to actual needs. The specific configuration of each circuit or unit is not limited; and it may be composed of analog devices according to a circuit principle, or may be composed of digital chips, or configured in other suitable ways.

Figure 11:
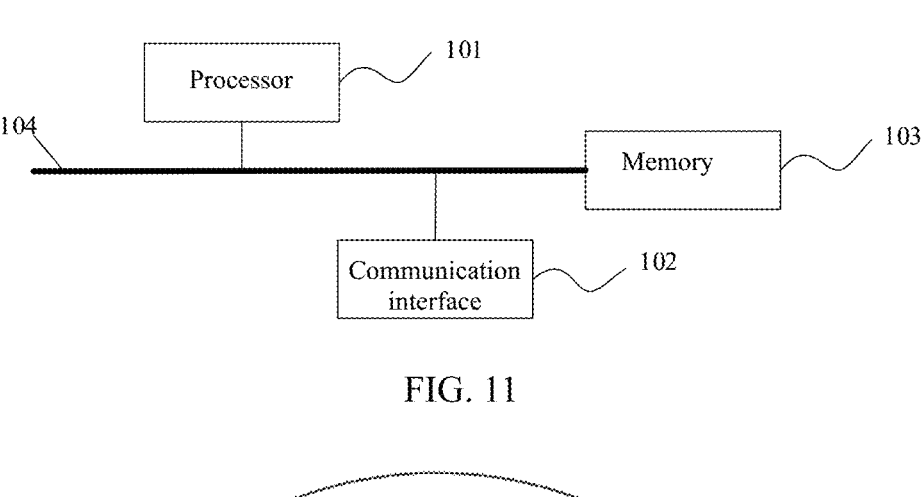
FIG. 11 is a schematic diagram of an electronic device provided by at least one embodiment of the present disclosure.

At least one embodiment of the present disclosure further provides an electronic device. FIG. 11 is a schematic diagram of an electronic device provided by at least one embodiment of the present disclosure.

For example, as shown in FIG. 11, the electronic device includes a processor 101, a communication interface 102, a memory 103, and a communication bus 104. The processor 101, the communication interface 102, and the memory 103 communicate with each other via the communication bus 104; and the processor 101, the communication interface 102, the memory 103 and so on may also communicate through a network connection. The present disclosure does not limit the type and function of the network here. It should be noted that the components of the electronic device shown in FIG. 11 are exemplary rather than limitative, and the electronic device may also have other components according to actual application requirements.

For example, the memory 103 is used to store computer-readable instructions on a non-transitory basis. When executing the computer-readable instructions, the processor 101 is configured to implement the gesture recognizing method according to any one of the foregoing embodiments. For the specific implementation of each step of the gesture recognizing method and related explanations, reference may be made to the embodiments of the gesture recognizing method as described above, which will not be repeated here.

For example, other implementations of the gesture recognizing method implemented by the processor 101 by executing the computer-readable instructions stored in the memory 103 are the same as the implementations mentioned in the foregoing method embodiments, which will not be repeated here.

For example, the communication bus 104 may be a Peripheral Component Interconnect Standard (PCI) bus, an Extended Industry Standard Architecture (EISA) bus, or the like. The communication bus can be divided into an address bus, a data bus, a control bus, and the like. For ease of representation, only a bold line is used in the drawing, but it does not mean that there is only one bus or one type of bus.

For example, the communication interface 102 is used to implement communication between the electronic device and other devices.

For example, the processor 101 and the memory 103 may be arranged at the server (or cloud).

For example, the processor 101 can control other components in the electronic device to perform desired functions. The processor 101 may be a Central Processing Unit (CPU), a Network Processor (NP), a Tensor Processing Unit (TPU) or a Graphics Processing Unit (GPU) and any other device with data processing capabilities and/or program executing capabilities; it may also be a Digital Signal Processor (DSP), Application Specific Integrated Circuit (ASIC), a Field Programmable Gate Array (FPGA) or any other programmable logic device, a discrete gate or transistor logic device, and a discrete hardware component. The Central Processing Unit (CPU) may be of X86 or ARM architecture, etc.

For example, the memory 103 may include any combination of one or more computer program products, which may include various forms of computer-readable storage media, such as a volatile memory and/or a non-volatile memory. The volatile memory may include, for example, a Random Access Memory (RAM) and/or a cache. The non-volatile memory may include, for example, a Read-Only Memory (ROM), a hard disk, an Erasable Programmable Read-Only Memory (EPROM), a Compact Disc Read-Only Memory (CD-ROM), a USB, a flash disc, and the like. One or more computer-readable instructions can be stored on the computer-readable storage medium, and the processor 101 can execute the computer-readable instructions to implement various functions of the electronic device. Various application programs, various data, and the like can also be stored in the storage medium.

For example, in some embodiments, the electronic device may further include an image acquiring component. The image acquiring component is used to acquire images. The memory 903 is also used to store the images acquired.

For example, the image acquiring component may be the photographing apparatus as described above.

For example, for a detailed description of the process of performing gesture recognition by the electronic device, reference may be made to the relevant description in the embodiment of the gesture recognizing method, which will not be repeated here.

Figure 12:
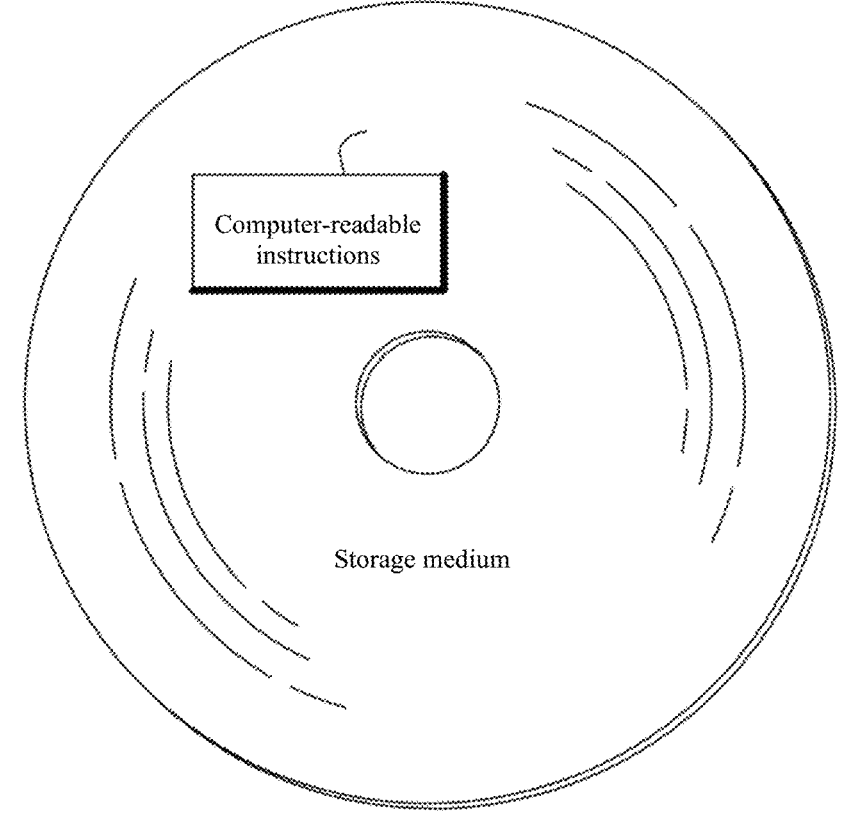
FIG. 12 is a schematic diagram of a non-transitory computer-readable storage medium provided by at least one embodiment of the present disclosure.

FIG. 12 is a schematic diagram of a non-transitory computer-readable storage medium provided by at least one embodiment of the present disclosure. For example, as shown in FIG. 12, a storage medium 1000 may be a non-transitory computer-readable storage medium, and one or more computer-readable instructions 1001 may be stored non-transitorily in the storage medium 1000. For example, when the computer-readable instructions 1001 are executed by the processor, one or more steps in the gesture recognizing method described above may be performed.

For example, the storage medium 1000 may be applied to the above-mentioned electronic device, for example, the storage medium 1000 may include a memory in the electronic device.

For example, the storage medium may include a memory card of a smartphone, a memory component of a tablet computer, a hard disk of a personal computer, a Random Access Memory (RAM), a Read-Only Memory (ROM), an Erasable Programmable Read-Only Memory (EPROM), a Compact Disc Read-Only Memory (CD-ROM), a flash disc, or any combination of the above-mentioned storage media, or may be any other applicable storage medium.

For example, for the description of the storage medium 1000, reference may be made to the description of the memory in the embodiment of the electronic device, which will not be repeated.

Figure 13:
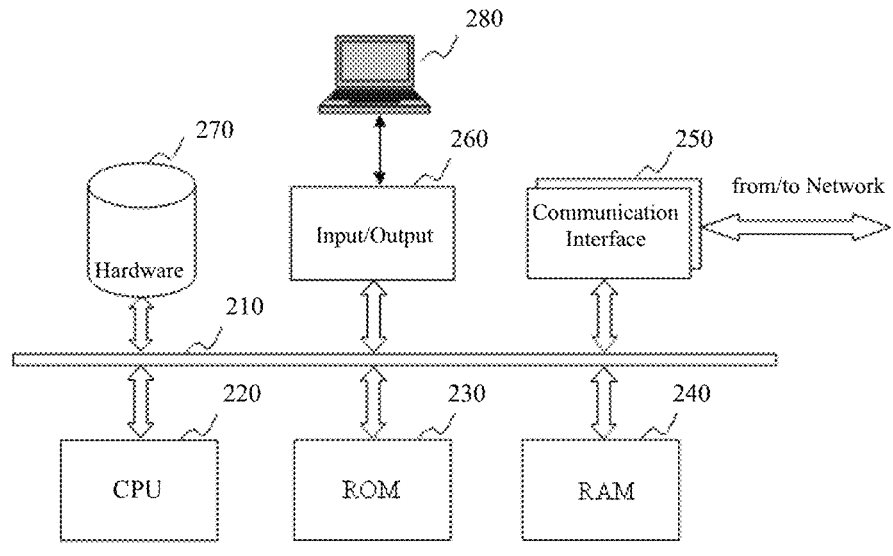
FIG. 13 is a schematic diagram of a hardware environment provided by at least one embodiment of the present disclosure.

FIG. 13 shows a schematic diagram of a hardware environment provided by at least one embodiment of the present disclosure. The electronic device provided by the present disclosure can be applied in the Internet system.

The functions of the gesture recognizing device and/or the electronic device involved in the present disclosure can be implemented by using the computer system provided in FIG. 13. Such a computer system may include a personal computer, a laptop, a tablet computer, a mobile phone, a personal digital assistant, smart glasses, a smart watch, a smart ring, a smart helmet, and any smart portable or wearable device. The specific system in this embodiment illustrates a hardware platform including a user interface using a functional block diagram. Such a computer device may be a general-purpose computer device or a special-purpose computer device. Both computer devices can be used to implement the gesture recognizing device and/or electronic device in this embodiment. The computer system may include any components that implement the presently described information required to implement gesture recognition. For example, the computer system may be implemented by a computer device through its hardware device, a software program, a firmware, and a combination thereof. For the sake of convenience, only one computer device is drawn in FIG. 13, but the relevant computer functions described in this embodiment to implement the information required for gesture recognition can be implemented in a distributed manner by a group of similar platforms, to disperse the processing load of the computer system.

As shown in FIG. 13, the computer system may include a communication port 250, which is connected to a network for data communication, for example, the computer system can transmit and receive information and data through the communication port 250, that is, the communication port 250 can implement wireless or wired communication between the computer system and other electronic devices to exchange data. The computer system may also include a processor group 220 (i.e., the processor described above) for executing program instructions. The processor group 220 may be composed of at least one processor (e.g., CPU). The computer system may include an internal communication bus 210. The computer system may include different forms of program storage units and data storage units (that is, the memory or storage medium described above), such as a hard disk 270, a Read-Only Memory (ROM) 230, a Random Access Memory (RAM) 240, which can be used to store various data files used by the computer for processing and/or communicating, and possible program instructions executed by the processor group 220. The computer system may also include an input/output component 260 for enabling input/output data flow between the computer system and other components (e.g., a user interface 280, etc.).

Typically, the following apparatuses may be connected to the input/output component 260: including input apparatuses, such as a touch screen, a touch pad, a keyboard, a mouse, a camera, a microphone, an accelerometer, a gyroscope, etc.; output apparatuses such as a Liquid Crystal Display (LCD), a speaker, a vibrator, etc.; storage apparatuses such as a magnetic tape, a hard disk, etc.; and communication interfaces.

Although FIG. 13 shows a computer system with various devices, it should be understood that the computer system is not required to have all of the devices shown and, instead, the computer system may have more or less devices.

For this disclosure, the following points need to be explained:

(1) The drawings of the embodiment of the present disclosure only relate to the structure related to the embodiment of the present disclosure, and other structures can refer to the general design.

(2) For the sake of clarity, the thickness and size of layers or structures are exaggerated in the drawings used to describe embodiments of the present invention. It will be understood that when an element such as a layer, film, region or substrate is referred to as being "on" or "under" another element, the element may be "directly" on or "under" another element, or intervening elements may be present.

(3) In case of no conflict, the embodiments of the present disclosure and features in the embodiments can be combined with each other to obtain a new embodiment.

The above is only the specific embodiment of this disclosure, but the protection scope of this disclosure is not limited to this, and the protection scope of this disclosure shall be subject to the protection scope of the claims.

What is claimed is:

1. A gesture recognizing method, comprising:

acquiring a plurality of groups of images taken respectively at different photographing moments for a gesture action object, wherein each group of images comprises at least one pair of corresponding depth map and grayscale map; and according to the plurality of groups of images, obtaining spatial information by using the depth map in each group of images, and obtaining posture information for the gesture action object by using the grayscale map in each group of the images, to recognize a dynamic gesture change of the gesture action object, wherein acquiring the plurality of groups of images taken respectively at different photographing moments for the gesture action object, comprises:

obtaining a plurality of groups of images respectively corresponding to the different photographing moments, by using at least one photographing apparatus to continuously photograph the gesture action object, wherein each photographing apparatus is configured to synchronously output a pair of corresponding depth map and grayscale map at one photographing moment, wherein obtaining the plurality of groups of images respectively corresponding to the different photographing moments, by using the at least one photographing apparatus to continuously photograph the gesture action object, comprises:

by using each photographing apparatus to continuously photograph the gesture action object, obtaining a plurality of pairs of output depth maps and grayscale maps respectively corresponding to the different photographing moments output by the photographing apparatus, wherein each photographing apparatus comprises a first acquiring unit, the first acquiring unit is configured to acquire a grayscale map in every first frame, and acquire a depth map in every N first frames, wherein the depth map is generated based on N grayscale maps acquired in every N consecutive first frames, the N grayscale maps respectively correspond to N different phases, the depth map and one grayscale map among the N grayscale maps are synchronously output from the photographing apparatus, where N is a positive integer greater than 1;

by using each photographing apparatus to continuously photograph the gesture action object, obtaining the plurality of pairs of output depth maps and grayscale maps respectively corresponding to the different photographing moments output by the photographing apparatus, comprises:

outputting one pair of output depth map and grayscale map corresponding to each other in every first frame by using the photographing apparatus, wherein the output depth map is obtained by smooth trajectory fitting and prediction according to the N grayscale maps and the depth map.

2. The gesture recognizing method according to claim 1, wherein obtaining the spatial information by using the depth map in each group of images, comprises:

determining a gesture region in the depth map according to the depth map, wherein the spatial information comprises the gesture region in the depth map;

obtaining the posture information for the gesture action object by using the grayscale map in each group of the images, comprises:

determining the posture information for the gesture action object corresponding to each group of images according to the gesture region in the depth map and the grayscale map; and recognizing the dynamic gesture change of the gesture action object, comprises:

determining the dynamic gesture change of the gesture action object according to posture information for the gesture action object respectively corresponding to the plurality of groups of images.

3. The gesture recognizing method according to claim 2, wherein determining the gesture region in the depth map according to the depth map, comprises:

traversing the depth map, and counting depth data in the depth map, to build a depth histogram;

selecting an adaptive depth threshold corresponding to the depth map, and determining the gesture region in the depth map according to the adaptive depth threshold and the depth histogram.

4. The gesture recognizing method according to claim 2, wherein the posture information for the gesture action object corresponding to each group of images comprises finger state information and position information, determining the posture information for the gesture action object corresponding to each group of images, according to the grayscale map and the gesture region in the depth map, comprises:

applying the gesture region in the depth map to the grayscale map to obtain a gesture analysis region in the grayscale map;

performing binary processing on the gesture analysis region to obtain a gesture connected domain;

performing convex hull detection on the gesture connected domain to obtain the finger state information, wherein the finger state information comprises whether a finger is stretched out or not, and a count of fingers stretched out; and determining the position information based on the depth map, wherein the position information comprises a coordinate position of the gesture action object in a gesture interactive space.

5. The gesture recognizing method according to claim 4, wherein determining the dynamic gesture change of the gesture action object according to the posture information for the gesture action object respectively corresponding to the plurality of groups of images, comprises:

determining a finger outstretched state change and a position change of the gesture action object during a recognition period composed of the different photographing moments, according to finger state information and position information corresponding to the plurality of groups of images; and determining the dynamic gesture change of the gesture action object, according to the finger outstretched state change and the position change corresponding to the plurality of groups of images.

6. The gesture recognizing method according to claim 5, wherein the coordinate position comprises a depth coordinate, the dynamic gesture change of the gesture action object comprises a gesture action, determining the dynamic gesture change of the gesture action object, according to the finger outstretched state change and the position change, comprises:

determining that the gesture action is a click gesture, in response to the finger outstretched state change indicating that at least one finger of the gesture action object is in an outstretched state during at least part of time period of the recognition period, and the position change indicating that a depth coordinate of a target recognition point of the gesture action object decreases first and then increases during the at least part of time period.

7. The gesture recognizing method according to claim 5, wherein the coordinate position comprises a depth coordinate, and the dynamic gesture change of the gesture action object comprises a gesture action, determining the dynamic gesture change of the gesture action object, according to the finger outstretched state change and the position change, comprises:

determining that the gesture action is a long-press gesture, in response to the finger outstretched state change indicating that at least one finger of the gesture action object is in an outstretched state during at least part of time period of the recognition period, and the position change indicating that a depth coordinate of a target recognition point of the gesture action object decreases first and then is maintained during the at least part of time period, and a time length for the maintenance exceeding a first threshold.

8. The gesture recognizing method according to claim 5, wherein the dynamic gesture change of the gesture action object comprises a gesture action, determining the dynamic gesture change of the gesture action object, according to the finger outstretched state change and the position change, comprises:

determining that the gesture action is a slide gesture, in response to the finger outstretched state change indicating that at least one finger of the gesture action object is in an outstretched state during at least part of time period of the recognition period, and the position change indicating that a distance that a target recognition point of the gesture action object slides along a preset direction during the at least part of time period exceeds a second threshold, wherein the distance is calculated based on position information of the target recognition point of the gesture action object in the plurality of groups of images.

9. The gesture recognizing method according to claim 5, wherein the dynamic gesture change of the gesture action object comprises a gesture action, determining the dynamic gesture change of the gesture action object, according to the finger outstretched state change and the position change, comprises:

determining that the gesture action is a grab gesture, in response to the finger outstretched state change indicating that the gesture action object transitions from a state where at least one finger is stretched out to a state where no finger is stretched out during the recognition period; and determining that the gesture action is a release gesture, in response to the finger outstretched state change indicating that the gesture action object transitions from a state where no finger is stretched out to a state where at least one finger is stretched out during the recognition period.

10. The gesture recognizing method according to claim 1, wherein a plurality of photographing apparatuses are provided, each group of images comprises a plurality of pairs of corresponding depth maps and grayscale maps, the plurality of pairs of corresponding depth maps and grayscale maps are obtained by synchronously photographing the gesture action object by the plurality of photographing apparatuses at a same photographing moment, and the plurality of pairs of corresponding depth maps and grayscale maps have different photographing angles.

11. A gesture recognizing method, comprising:

acquiring a plurality of groups of images taken respectively at different photographing moments for a gesture action object, wherein each group of images comprises at least one pair of corresponding depth map and grayscale map; and according to the plurality of groups of images, obtaining spatial information by using the depth map in each group of images, and obtaining posture information for the gesture action object by using the grayscale map in each group of the images, to recognize a dynamic gesture change of the gesture action object, wherein acquiring the plurality of groups of images taken respectively at different photographing moments for the gesture action object, comprises:

obtaining a plurality of groups of images respectively corresponding to the different photographing moments, by using at least one photographing apparatus to continuously photograph the gesture action object, wherein each photographing apparatus is configured to synchronously output a pair of corresponding depth map and grayscale map at one photographing moment, wherein obtaining the plurality of groups of images respectively corresponding to the different photographing moments, by using the at least one photographing apparatus to continuously photograph the gesture action object, comprises:

by using each photographing apparatus to continuously photograph the gesture action object, obtaining a plurality of pairs of output depth maps and grayscale maps respectively corresponding to the different photographing moments output by the photographing apparatus, wherein each photographing apparatus comprises a first acquiring unit, the first acquiring unit is configured to acquire a grayscale map in every first frame, and acquire a depth map in every N first frames, wherein the depth map is generated based on N grayscale maps acquired in every N consecutive first frames, the N grayscale maps respectively correspond to N different phases, the depth map and one grayscale map among the N grayscale maps are synchronously output from the photographing apparatus, where N is a positive integer greater than 1;

by using each photographing apparatus to continuously photograph the gesture action object, obtaining the plurality of pairs of depth maps and grayscale maps respectively corresponding to the different photographing moments output by the photographing apparatus, comprises:

outputting a pair of corresponding depth map and grayscale map in at most every N–1 first frames by using the photographing apparatus, wherein for one pair of corresponding depth map and grayscale map output in a same frame, the output depth map is obtained based on grayscale maps of N–1 first frames adjacent to the output grayscale map, and the output grayscale map and the grayscale maps of the N–1 first frames correspond to the N different phases.

12. The gesture recognizing method according to claim 11, wherein obtaining the spatial information by using the depth map in each group of images, comprises:

determining a gesture region in the depth map according to the depth map, wherein the spatial information comprises the gesture region in the depth map;

obtaining the posture information for the gesture action object by using the grayscale map in each group of the images, comprises:

determining the posture information for the gesture action object corresponding to each group of images according to the gesture region in the depth map and the grayscale map; and recognizing the dynamic gesture change of the gesture action object, comprises:

determining the dynamic gesture change of the gesture action object according to posture information for the gesture action object respectively corresponding to the plurality of groups of images.

13. The gesture recognizing method according to claim 12, wherein determining the gesture region in the depth map according to the depth map, comprises:

traversing the depth map, and counting depth data in the depth map, to build a depth histogram;

selecting an adaptive depth threshold corresponding to the depth map, and determining the gesture region in the depth map according to the adaptive depth threshold and the depth histogram.

14. The gesture recognizing method according to claim 12, wherein the posture information for the gesture action object corresponding to each group of images comprises finger state information and position information, determining the posture information for the gesture action object corresponding to each group of images, according to the grayscale map and the gesture region in the depth map, comprises:

applying the gesture region in the depth map to the grayscale map to obtain a gesture analysis region in the grayscale map;

performing binary processing on the gesture analysis region to obtain a gesture connected domain;

performing convex hull detection on the gesture connected domain to obtain the finger state information, wherein the finger state information comprises whether a finger is stretched out or not, and a count of fingers stretched out; and determining the position information based on the depth map, wherein the position information comprises a coordinate position of the gesture action object in a gesture interactive space.

15. The gesture recognizing method according to claim 14, wherein determining the dynamic gesture change of the gesture action object according to the posture information for the gesture action object respectively corresponding to the plurality of groups of images, comprises:

determining a finger outstretched state change and a position change of the gesture action object during a recognition period composed of the different photographing moments, according to finger state information and position information corresponding to the plurality of groups of images; and determining the dynamic gesture change of the gesture action object, according to the finger outstretched state change and the position change corresponding to the plurality of groups of images.

16. A gesture recognizing method, comprising:

acquiring a plurality of groups of images taken respectively at different photographing moments for a gesture action object, wherein each group of images comprises at least one pair of corresponding depth map and grayscale map; and according to the plurality of groups of images, obtaining spatial information by using the depth map in each group of images, and obtaining posture information for the gesture action object by using the grayscale map in each group of the images, to recognize a dynamic gesture change of the gesture action object, wherein acquiring the plurality of groups of images taken respectively at different photographing moments for the gesture action object, comprises:

obtaining a plurality of groups of images respectively corresponding to the different photographing moments, by using at least one photographing apparatus to continuously photograph the gesture action object, wherein each photographing apparatus is configured to synchronously output a pair of corresponding depth map and grayscale map at one photographing moment, wherein obtaining the plurality of groups of images respectively corresponding to the different photographing moments, by using the at least one photographing apparatus to continuously photograph the gesture action object, comprises:

by using each photographing apparatus to continuously photograph the gesture action object, obtaining a plurality of pairs of output depth maps and grayscale maps respectively corresponding to the different photographing moments output by the photographing apparatus, wherein each photographing apparatus comprises a first acquiring unit and a second acquiring unit, the second acquiring unit is configured to output a grayscale map in every second frame, and the first acquiring unit is configured to output a depth map in every M second frames, where M is a positive integer greater than 1, by using each photographing apparatus to continuously photograph the gesture action object, obtaining the plurality of pairs of depth maps and grayscale maps respectively corresponding to the different photographing moments output by the photographing apparatus, comprises:

outputting a pair of corresponding depth map and grayscale map in at most every M−1 second frames by using the photographing apparatus, wherein the output depth map comprises a reference depth map, or a depth map obtained by smooth trajectory fitting and prediction based on the reference depth map and at least one grayscale map corresponding to the reference depth map, wherein the reference depth map comprises a depth map output by the first acquiring unit at a current second frame or before the current second frame, the current second frame is a second frame outputting the pair of corresponding depth map and grayscale map, and the at least one grayscale map comprises a grayscale map output by the second acquiring unit between the current second frame and a second frame corresponding to the reference depth map.

17. The gesture recognizing method according to claim 16, wherein obtaining the spatial information by using the depth map in each group of images, comprises:

determining a gesture region in the depth map according to the depth map, wherein the spatial information comprises the gesture region in the depth map;

obtaining the posture information for the gesture action object by using the grayscale map in each group of the images, comprises:

determining the posture information for the gesture action object corresponding to each group of images according to the gesture region in the depth map and the grayscale map; and recognizing the dynamic gesture change of the gesture action object, comprises:

determining the dynamic gesture change of the gesture action object according to posture information for the gesture action object respectively corresponding to the plurality of groups of images.

18. The gesture recognizing method according to claim 17, wherein determining the gesture region in the depth map according to the depth map, comprises:

traversing the depth map, and counting depth data in the depth map, to build a depth histogram;

selecting an adaptive depth threshold corresponding to the depth map, and determining the gesture region in the depth map according to the adaptive depth threshold and the depth histogram.

19. The gesture recognizing method according to claim 17, wherein the posture information for the gesture action object corresponding to each group of images comprises finger state information and position information, determining the posture information for the gesture action object corresponding to each group of images, according to the grayscale map and the gesture region in the depth map, comprises:

applying the gesture region in the depth map to the grayscale map to obtain a gesture analysis region in the grayscale map;

performing binary processing on the gesture analysis region to obtain a gesture connected domain;

performing convex hull detection on the gesture connected domain to obtain the finger state information, wherein the finger state information comprises whether a finger is stretched out or not, and a count of fingers stretched out; and determining the position information based on the depth map, wherein the position information comprises a coordinate position of the gesture action object in a gesture interactive space.

20. The gesture recognizing method according to claim 19, wherein determining the dynamic gesture change of the gesture action object according to the posture information for the gesture action object respectively corresponding to the plurality of groups of images, comprises:

determining a finger outstretched state change and a position change of the gesture action object during a recognition period composed of the different photographing moments, according to finger state information and position information corresponding to the plurality of groups of images; and determining the dynamic gesture change of the gesture action object, according to the finger outstretched state change and the position change corresponding to the plurality of groups of images.

* * * * *